US011341868B2

(12) United States Patent
Horst et al.

(10) Patent No.: US 11,341,868 B2
(45) Date of Patent: May 24, 2022

(54) VASCULAR ACCESS TRAINING SIMULATOR SYSTEM AND TRANSPARENT ANATOMICAL MODEL

(71) Applicant: TELEFLEX MEDICAL INCORPORATED, Morrisville, NC (US)

(72) Inventors: Benjamin Horst, Lititz, PA (US); Mark Spinka, Jenkintown, PA (US); Jacob Ammarell, Leesport, PA (US)

(73) Assignee: TELEFLEX MEDICAL INCORPORATED, Morrisville, NC (US)

( * ) Notice: Subject to any disclaimer, the term of this patent is extended or adjusted under 35 U.S.C. 154(b) by 276 days.

(21) Appl. No.: 16/605,787

(22) PCT Filed: Apr. 18, 2018

(86) PCT No.: PCT/US2018/028139
§ 371 (c)(1),
(2) Date: Oct. 16, 2019

(87) PCT Pub. No.: WO2018/195178
PCT Pub. Date: Oct. 25, 2018

(65) Prior Publication Data
US 2020/0126449 A1    Apr. 23, 2020

Related U.S. Application Data

(60) Provisional application No. 62/486,878, filed on Apr. 18, 2017.

(51) Int. Cl.
*G09B 23/30* (2006.01)
*G09B 23/28* (2006.01)

(52) U.S. Cl.
CPC ......... *G09B 23/285* (2013.01); *G09B 23/286* (2013.01)

(58) Field of Classification Search
CPC ....... G09B 23/28; G09B 23/30; G09B 23/303
See application file for complete search history.

(56) References Cited

U.S. PATENT DOCUMENTS

| | | | |
|---|---|---|---|
| 9,436,993 B1 | 9/2016 | Stolka et al. | |
| 2005/0181342 A1* | 8/2005 | Toly | G09B 23/285 434/262 |

(Continued)

FOREIGN PATENT DOCUMENTS

| | | | | |
|---|---|---|---|---|
| CN | 102708745 | * | 9/2015 | ............. G09B 23/28 |
| CN | 102708745 B | | 9/2015 | |
| JP | 2014-32362 A | | 2/2014 | |

OTHER PUBLICATIONS

International Search Report from PCT/US2018/028139; dated Aug. 27, 2018.

(Continued)

*Primary Examiner* — Kurt Fernstrom
(74) *Attorney, Agent, or Firm* — BakerHostetler

(57) ABSTRACT

A vascular access training simulator system for training intravascular insertion of a medical device is disclosed. The vascular access training simulator system includes an anatomical training model having clinically relevant ultrasonic properties representative of ultrasonic properties of a human body site for ultrasound imaging. The training model includes a transparent housing, a transparent simulated tissue, at least one simulated blood vessel suspended in the tissue, and a layer of simulated skin covering the housing and the tissue. A first imaging device is records a first video showing a view of an insertion site outside of the simulated skin. A second imaging device records a second video showing the simulated blood vessel through the transparent (Continued)

simulated tissue. A third imaging device is shows an ultrasound view of the simulated blood vessel and the simulated tissue. A monitor displays a composite view of all three videos simultaneously on a single screen.

20 Claims, 18 Drawing Sheets

(56) References Cited

U.S. PATENT DOCUMENTS

| | | | |
|---|---|---|---|
| 2009/0012821 A1* | 1/2009 | Besson | H04N 21/2665 |
| | | | 705/3 |
| 2009/0098521 A1* | 4/2009 | Kuo | G09B 23/30 |
| | | | 434/267 |
| 2012/0179039 A1 | 7/2012 | Pelissier et al. | |
| 2013/0078603 A1* | 3/2013 | Yang | G09B 23/285 |
| | | | 434/268 |
| 2015/0371560 A1* | 12/2015 | Lowe | G09B 23/281 |
| | | | 434/273 |
| 2016/0249984 A1 | 9/2016 | Janssen | |
| 2016/0314716 A1* | 10/2016 | Grubbs | H04L 1/0018 |
| 2017/0011658 A1* | 1/2017 | Ozaki | G09B 23/34 |
| 2017/0243522 A1* | 8/2017 | Feins | G09B 23/286 |
| 2017/0263158 A1* | 9/2017 | East | A61B 17/1671 |
| 2019/0090969 A1* | 3/2019 | Jarc | G09B 23/30 |
| 2019/0378436 A1* | 12/2019 | Krummenacher | G09B 23/303 |

OTHER PUBLICATIONS

International Preliminary Report on Patentability and Written Opinion issued in PCT/US2018/028139, dated Oct. 31, 2019.

\* cited by examiner

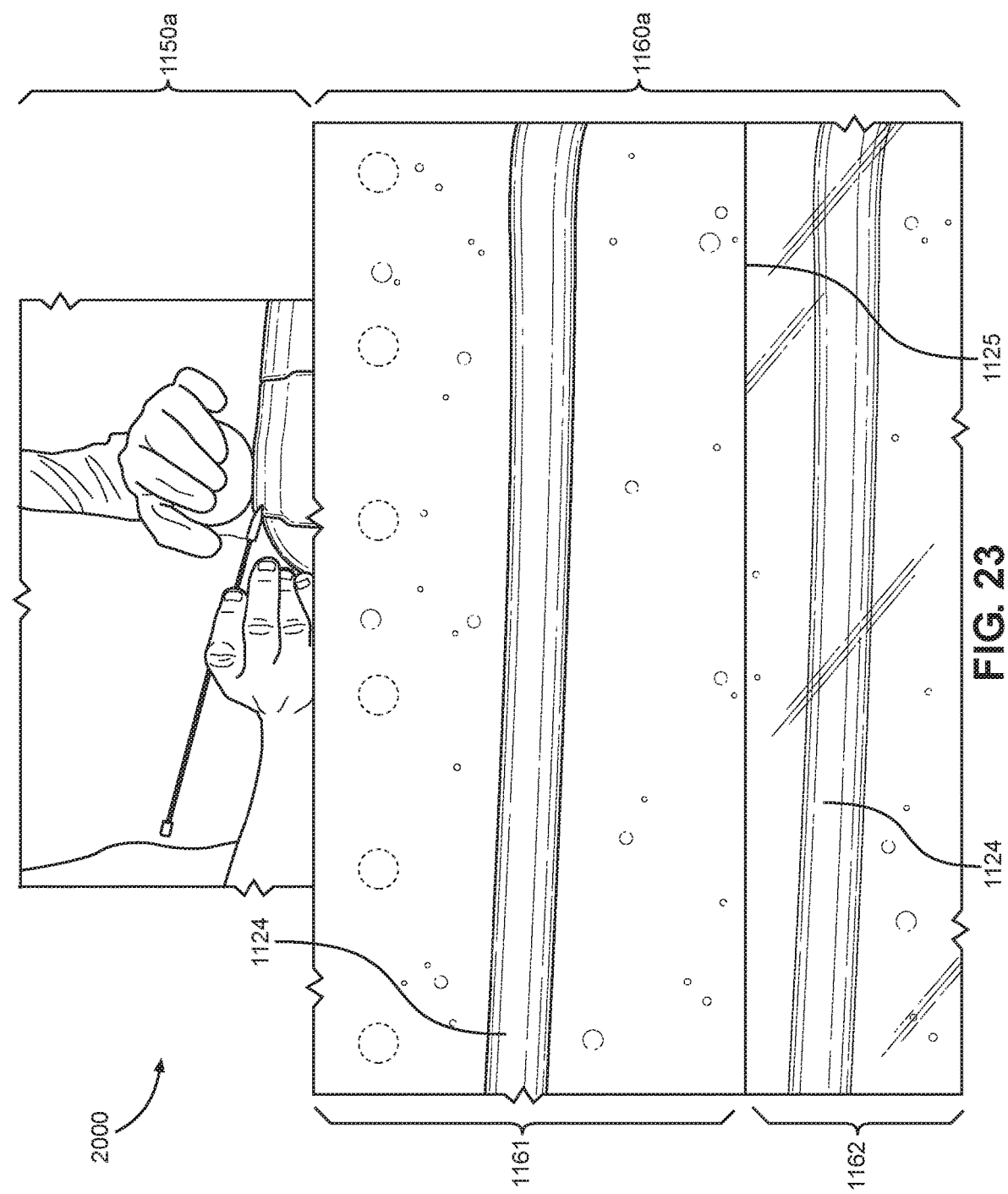

VASCULAR ACCESS TRAINING SIMULATOR SYSTEM AND TRANSPARENT ANATOMICAL MODEL

CROSS-REFERENCE TO RELATED APPLICATION

This application is a National Stage Entry of PCT/US2018/028139, filed on Apr. 18, 2018, which claims the benefit of U.S. Provisional Application No. 62/486,878, filed on Apr. 18, 2017, the disclosures of which are hereby incorporated by reference in their entirety.

TECHNICAL FIELD

This disclosure generally relates to a vascular access training simulator system, and more specifically, to a transparent anatomical training model for use in a vascular access training simulator system.

BACKGROUND

Venipuncture is a common medical procedure that is performed to obtain intravenous access for various purposes, including collecting blood or administering intravenous therapy, among others. Insertion of a medical device, such as a needle, into a patient's vein is often difficult since veins can be small in diameter and can be located deep beneath the surface of the skin. As a result, the intended blood vessel might not be hit in a single insertion, thus requiring multiple puncture attempts and causing excess trauma to the patient. To rectify this problem, ultrasound guidance may be used during the insertion of a needle into the vasculature of a patient so that the clinician can attempt to track the needle through the subcutaneous tissue and into the vessel. Although clinicians may currently use ultrasound guidance for venipuncture, the skill level of the clinicians to properly track the needle into the vein varies greatly, and oftentimes the clinicians do not use the ultrasound equipment properly. Thus, even with the benefit of ultrasound, a venipuncture procedure may still often be unsuccessful. For example, a clinician may not position the plane or the beam of an ultrasound probe to be directed over the tip of the insertion needle, and thus the needle tip location would not be correctly seen by the clinician.

Additionally, even if a clinician is able to use ultrasound to successfully insert a needle into the vasculature of a patient, this may not be enough to ensure proper placement thereof. This is because typically venipuncture of a needle is followed by insertion of a guidewire and/or intravascular catheter in order to provide the clinician with vessel access for the duration of the therapy needed. The subsequent insertion of a guidewire and/or catheter that follows venipuncture has nuances and complications that may also prevent proper placement. For example, if a clinician uses too steep of an insertion angle, the catheter may not thread properly into the vessel.

It is common for clinicians to practice their technique by performing an ultrasound guided needle insertion process on a training model before performing the process on a human body. There are conventional venipuncture models for this purpose, and some of these conventional venipuncture models also allow for training with ultrasound guidance. However, these conventional models do not provide sufficient feedback to the clinician so that they can visualize what is occurring under the skin with the needle during venipuncture. Moreover, these conventional models do not provide sufficient feedback to the clinician so that they can visualize what is occurring under the skin with a guidewire or catheter, if applicable, during a subsequent insertion processes. As a result, conventional venipuncture models do not provide the feedback necessary in order for the clinician to become a more competent inserter.

Consequently, without sufficient feedback to know what went wrong during a venipuncture training procedure, it is difficult for the clinician to improve their ultrasound and insertion skills. This problem is especially prevalent because conventional venipuncture training models do not have simulated tissue that is transparent for allowing a clinician to fully understand what is occurring during the insertion of a device under the skin, and that has clinically relevant ultrasonic properties while still closely replicating the look and feel of human tissue and organs. Thus, there is a need for a transparent anatomical venipuncture training model that has clinically relevant ultrasonic properties, and which closely mimics the behavior of human tissue and organs during needle insertion. Further, there is also a need for a vascular access training simulator system having such a transparent anatomical training model.

SUMMARY

The foregoing needs are met, to a great extent, by implementations of a vascular access training simulator system according to the present disclosure. Such a vascular access training simulator system includes a transparent anatomical training model that provides for the un-aided visualization of simulated vasculature, such as synthetic organs or body tissues. More specifically, the vascular access training simulator system allows a user/clinician to visualize how a medical device, such as a needle or catheter introducer, functions inside the body and underneath the surface of the skin when interacting with a blood vessel during an insertion procedure. The transparency of the model allows the clinician, as well as additional observers, to view underneath the surface of the skin during a procedure in order to provide definitive and understandable feedback to the clinician as to what went right but also what went wrong during a procedure so they can improve their technique. The model is further arranged to provide video recording of the procedure so that the clinician or onlookers can view the procedure live. The procedure can also be recorded for later viewing and evaluation.

In accordance with one implementation, a vascular access training simulator system for simulating intravascular insertion of a medical device comprises an anatomical training model including a transparent housing, a transparent simulated tissue formed with a ballistics gel, at least one transparent simulated blood vessel suspended in the ballistics gel, and a layer of simulated skin covering the housing. The transparent anatomical training model may have clinically relevant ultrasonic properties representative of ultrasonic properties of a human body site for ultrasound imaging. A first imaging device is configured to record a first video showing a view of an insertion site outside of the simulated skin. A second imaging device is configured to record a second video showing the simulated blood vessel through the transparent simulated tissue. A third imaging device is configured to record a third video showing an ultrasound view of the simulated blood vessel and the simulated tissue. A monitor may be provided for displaying all three videos simultaneously on a single screen.

In other implementations, an anatomical training model for intravascular insertion of a medical device comprises a transparent housing having an open top end and an open bottom end; a transparent simulated tissue formed with a ballistics gel provided within the housing; at least one simulated blood vessel suspended in the ballistics gel and configured to be in fluid communication with a blood analog at venous pressure; and a simulated skin layer removably attached to the top end of the housing. The training model may further have clinically relevant ultrasonic properties corresponding to ultrasonic properties of a human body site for ultrasound imaging.

In other implementations, a training simulator system for simulating intravascular insertion of a medical device comprises an anatomical training model comprising a puncture insert configured to simulate vasculature of a patient, the puncture insert including a transparent simulated body tissue, a transparent simulated blood vessel suspended in the simulated body tissue, and a layer of simulated skin covering a portion of the transparent simulated body tissue; a first imaging device configured to take a first video depicting a view of an insertion site on an outer surface of the puncture insert; a second imaging device configured to take a second video depicting a view of the transparent simulated blood vessel through the transparent simulated body tissue; and a monitor configured to display the first and second videos simultaneously in real-time.

According to some aspects, a third imaging device is configured to take a third video depicting an ultrasound view of the simulated blood vessel and the simulated body tissue.

According to some aspects, the monitor is further configured to display a composite view of the first, second and third videos simultaneously in real-time.

According to some aspects, the system may comprise a handheld ultrasound probe.

According to some aspects, the anatomical training model has clinically relevant ultrasonic properties representative of ultrasonic properties of a human body site for ultrasound imaging.

According to some aspects, the simulated body tissue includes clinically relevant ultrasonic acoustic and optical properties.

According to some aspects, the simulated body tissue comprises a colloidal suspension of a ballistic gel and poly(methyl methacrylate) (PMMA).

According to some aspects, the anatomical training model further comprises an anatomical body part attached to the puncture insert and configured to provide a proper orientation for the puncture insert.

According to some aspects, the anatomical training model further comprises a support base configured to stably and removably secure the puncture insert in a predetermined orientation.

According to some aspects, the second imaging device is attached to the support base.

According to some aspects, the anatomical training model is configured to simulate a venipuncture procedure.

According to some aspects, the simulated blood vessel is configured to receive a blood analog at venous pressure.

According to some aspects, the anatomical training model is configured to simulate a radial artery puncture procedure.

According to some aspects, the system comprises a pulsatile pump in fluid communication with the simulated blood vessel for pumping a pulsating flow of blood analog through the simulated blood vessel.

According to some aspects, the support base further comprises an adjustment knob configured to selectively control a compression member to adjust a pulse of the blood analog flowing through the simulated blood vessel.

In another implementation, an anatomical training model comprises a puncture insert configured to simulate vasculature of a patient, the puncture insert including a transparent housing having an open top end, a transparent simulated body tissue, at least one transparent simulated blood vessel suspended in the simulated body tissue, and a simulated skin layer; the transparent simulated body tissue provided within the housing; the simulated transparent blood vessel configured to be in fluid communication with a blood analog; the simulated skin layer removably attached to the housing and configured to cover a top surface of the simulated body tissue; and the training model further having clinically relevant ultrasonic properties corresponding to ultrasonic properties of a human body site for ultrasound imaging.

According to some aspects, the simulated body tissue includes clinically relevant ultrasonic acoustic and optical properties.

According to some aspects, the simulated body tissue comprises a colloidal suspension of a ballistic gel and poly(methyl methacrylate) (PMMA).

According to some aspects, the training model further comprises an anatomical body part attached to the puncture insert and configured to provide a proper orientation for the puncture insert.

According to some aspects, the anatomical body part comprises a simulated hand and a simulated wrist.

According to some aspects, the training model further comprises a support base configured to stably and removably secure the puncture insert in a predetermined orientation.

According to some aspects, the simulated blood vessel of the puncture insert is configured to simulate a vein.

According to some aspects, the simulated blood vessel of the puncture insert is configured to simulate a radial artery.

According to some aspects, the simulated blood vessel is configured to be in fluid communication with a pulsatile pump.

In another implementation, a method of making an anatomical training model comprises the steps of providing a hollow mold block including a bottom surface having a bottom opening and a top surface having a top opening; inserting a solid rod through the hollow mold block, the solid rod extending across a length of the mold block; securing a removable curved lid to the top surface of the mold block to cover the top opening; pouring the molten simulated body tissue material into the bottom opening of the mold and over the solid rod; cooling the molten simulated body tissue material to set a simulated body tissue; and removing the solid rod from the set simulated body tissue to create a cavity for the simulated vessel to be suspended in the simulated body tissue.

According to some aspects, the method further comprises the step of removing air from the molten simulated body tissue via a vacuum oven to prevent the formation of air bubbles.

According to some aspects, the method further comprises the step of removing the curved lid from the mold block to expose the set simulated body tissue from the top opening of the top surface of the mold block.

According to some aspects, the mold block comprises a polycarbonate resin.

According to some aspects, the simulated body tissue material comprises a ballistic gel medium.

According to some aspects, the simulated body tissue material further comprises white mineral oil and 2,6-di-tert-butyl-p-cresol mixed with 10-40% by weight mineral oil light.

According to some aspects, the simulated body tissue material further comprises poly(methyl methacrylate) (PMMA).

According to some aspects, the PMMA comprises beads or powder.

According to some aspects, the simulated body tissue material is configured to provide clinically relevant ultrasonic acoustic and optical properties.

Certain implementations of the vascular access training simulator system and transparent anatomical model have been outlined so that the detailed description below may be better understood. There are, of course, additional implementations that will be described below and which will form the subject matter of the claims. In this respect, it is to be understood that the vascular access training simulator system and transparent anatomical model is not limited in its application to the details of construction and to the arrangements of the components set forth in the following disclosure or illustrated in the drawings. Also, it is to be understood that the phraseology and terminology employed herein are for the purpose of description and should not be regarded as limiting. As such, the conception upon which this disclosure is based may readily be utilized as a basis for the designing of other structures, methods, and systems for carrying out the several purposes of the vascular access training simulator system and transparent anatomical model. It is understood, therefore, that the claims include such equivalent constructions insofar as they do not depart from the spirit and scope of the present disclosure.

BRIEF DESCRIPTION OF THE DRAWINGS

FIG. 4 illustrates a top plan view of the anatomical training model of FIG. 2.

FIG. 23 illustrates a video recording output displayed to a user during or after a simulated radial artery puncture procedure according to the present disclosure.

Implementations of the vascular access training simulator system are described with reference to the drawings, in which like reference numerals refer to like parts throughout.

DETAILED DESCRIPTION

Figure 1:
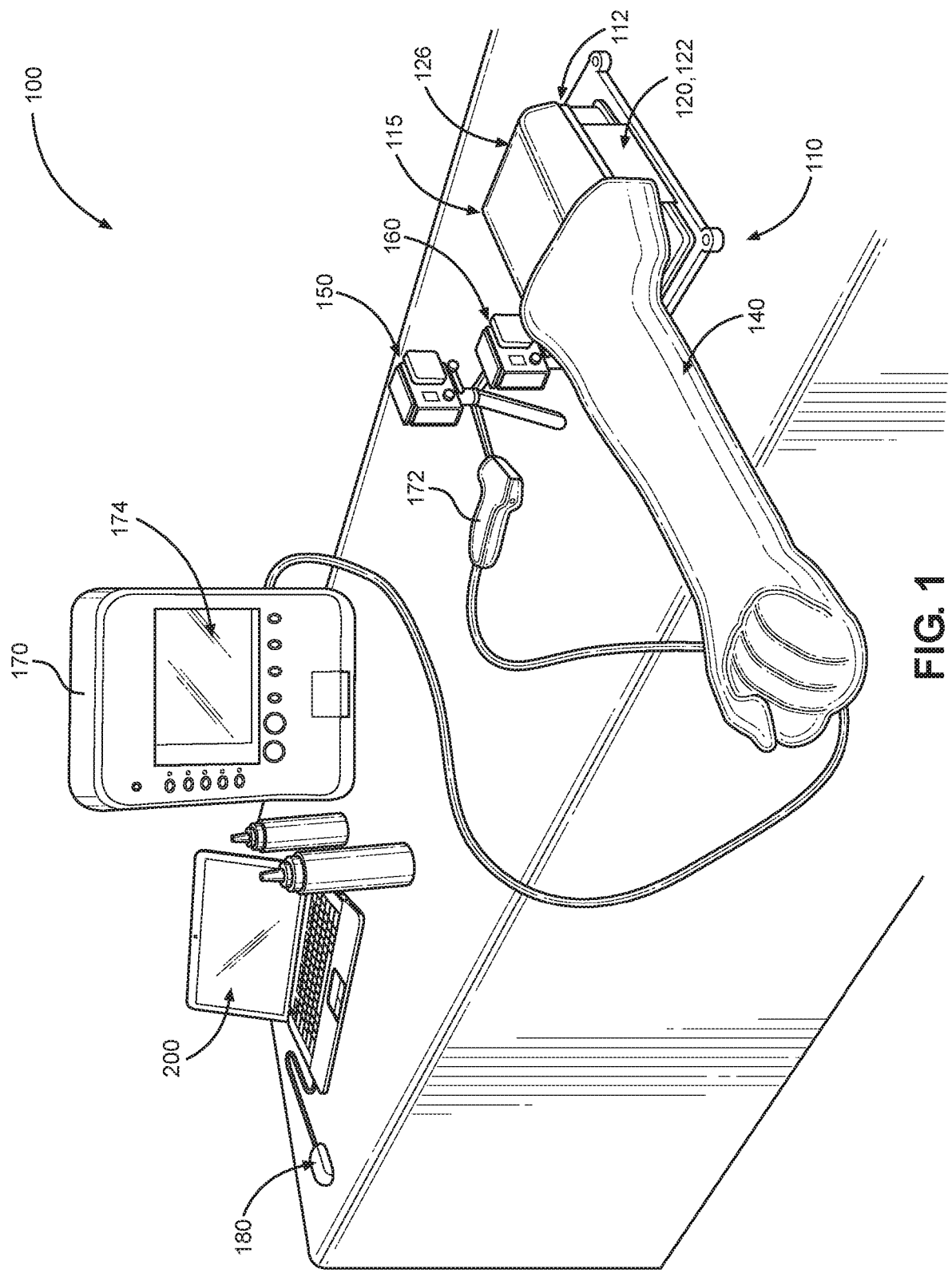
FIG. 1 illustrates a vascular access training simulator system according to the present disclosure.

Intravascular medical devices are commonly used to provide access to a patient's vasculature for drawing blood samples, providing therapy, and administering medicine, among other clinical needs. Examples of such intravascular medical devices include needle cannulas, catheter introducers, stylets, guidewires, and other elongate bodies that are percutaneously inserted into the venous or arterial vasculature of a patient. One challenge common to vascular-based procedures, however, is the process of inserting an intravascular medical device into a specific desired location of a patient's vasculature. During venipuncture, for example, veins may exhibit deformation due to puncturing the venous wall with a needle. Moreover, insertion of the needle may push veins out of position, thus requiring the clinician to use multiple attempts at accessing a particular blood vessel, instead of accessing it with a single insertion, and therefore resulting in excess trauma to the patient.

Moreover, as the intravascular device is inserted through a patient's skin and tissue, it is difficult for a clinician to ensure that the intravascular device is properly positioned at the desired location within the patient's vasculature. A clinician may use ultrasound imaging to monitor and confirm the proper positioning and placement of the intravascular devices. For example, a clinician performing ultrasound guided needle insertion can track the needle within the tissues of the patient to help guide the needle into the desired vasculature. However, vessels can be small in diameter and can be located deep beneath the surface of the skin. As a result, even with ultrasound guidance, if the clinician is not skilled with proper technique (for example, a clinician may not have the plane or beam of the ultrasound probe directed over the tip of the needle, therefore not correctly seeing the needle tip location), the intended blood vessel might not be hit in a single insertion, thus requiring multiple puncture attempts and causing excess trauma to the patient.

Additionally, even if the clinician is able to use ultrasound to successfully insert a needle into the vasculature of a patient, this may not be enough to ensure proper placement if venipuncture is followed by insertion of a guidewire and/or intravascular catheter. The subsequent insertion of a guidewire and/or catheter that follows venipuncture has nuances and complications that may also prevent proper placement. For example, if a clinician uses too steep of an insertion angle, the catheter may not thread properly into the vessel.

The present disclosure provides a vascular access training simulator system for pre-treatment planning and/or for training clinicians how to perform an ultrasound guided needle insertion. The vascular access training simulator system of the present disclosure further allows clinicians to complete the insertion procedure with subsequent guidewire or catheter device components in order to practice the procedure and build further competency by visualizing the insertion in an anatomical training model. Such training is advantageous in order to understand what went wrong during the insertion procedure before trying it on a human patient. The vascular access training simulator system and anatomical training model may be used to simulate a vascular access insertion procedure, such as venipuncture and radial artery puncture.

Figure 2:
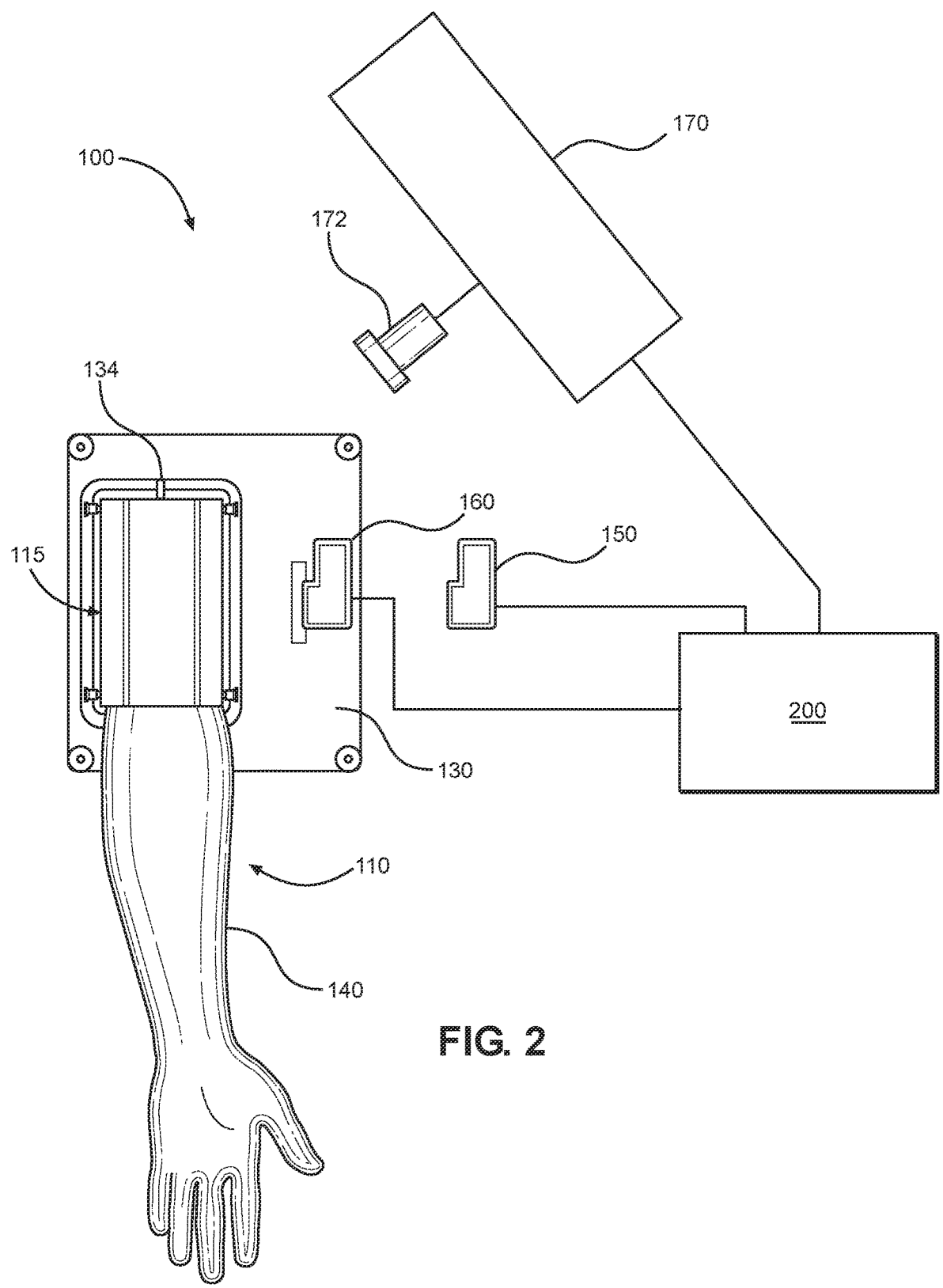
FIG. 2 illustrates a schematic top plan view of the vascular access training simulator system according to the present disclosure.

A vascular access training simulator system 100 according to an implementation of the present disclosure is depicted in FIGS. 1 and 2. The vascular access training simulator system 100 includes an anatomical training model 110, such as a phantom, that simulates a real human body site into which an intravascular medical device, such as a needle, can be inserted. According to one aspect, the vascular access training simulator system 100 is configured to simulate a venipuncture procedure. According to another aspect, the vascular access training simulator system is configured to simulate a radial arterial puncture procedure.

The anatomical training model 110 comprises a puncture insert 115, a support base 130, and an anatomical model limb or body part 140. In particular, the puncture insert 115 includes a transparent housing 120 configured to contain transparent simulated body tissue and organs 122. The puncture insert 115 further includes a simulated blood vessel 124 and a layer of simulated or synthetic skin 126. The simulated blood vessel 124 is transparent and is provided within the transparent housing 120. More particularly, the simulated blood vessel 124 is suspended in the transparent simulated body tissue 124 disposed within the transparent housing 120. A top surface of the transparent housing 120 is open to provide access to the simulated body tissue 122. The layer of synthetic skin 126 covers the transparent housing 120 and the transparent simulated body tissue 122. Further, the simulated blood vessel 124 extends through the transparent housing 120 and the transparent simulated body tissue and organs 122. A plurality of simulated blood vessels may be provided at various locations within the transparent housing 120. Thus, the anatomical training model 110 provides a way for a clinician to visualize simulated vasculature represented by the synthetic organs, body tissues, and blood vessels. For instance, the vascular access training simulator system 100 allows a clinician or other user to see how an intravascular medical device, such as a needle, a catheter, and/or a guidewire, among others, would function inside the body (i.e., underneath the surface of the skin) when interacting with a blood vessel.

The vascular access training simulator system 100 is further configured to capture and record multiple views of the insertion procedure on video, and to display each video recording in real-time on a single display screen or monitor 200, such as a computer screen. This allows the clinician or onlookers to easily view the procedure live in real-time from various different viewpoints without the need for them to turn their head towards separate display screens in order to see each different view. The procedure may also be recorded for later or repeat viewing and evaluation. In particular, three separate imaging devices, such as a video camera or an ultrasound probe, are configured to capture and record different types of images and/or viewpoints of the needle insertion procedure. Each of the first, second, and third imaging devices are arranged in either wired or wireless communication with the monitor 200 in order to display a composite view of the insertion procedure showing the video from each of the imaging devices on a single display screen, as will be discussed in detail below.

A first imaging device 150, such as a first digital video camera, is configured to capture and record a video showing a view of the clinician's hands during an insertion procedure. A second imaging device 160, such as a second digital video camera, is configured to capture and record a video showing a close-up side view of the simulated blood vessel 124 extending through the transparent housing 120 and the transparent simulated body tissue and organs 122. A third imaging device 170, such as an ultrasound machine, is configured to capture and record a video showing an ultrasound guidance view of the simulated blood vessel 124 during the insertion procedure. The ultrasound machine 170 comprises a handheld ultrasound transducer probe or wand 172 electrically connected thereto. The handheld ultrasound transducer probe or wand 172 is configured to obtain the ultrasound guidance view of the simulated blood vessel. The ultrasound probe 172 may also be used with an ultrasound gel to increase conduction between ultrasound waves and the simulated body tissue. The ultrasound machine 170 may further comprise an ultrasound display screen 174 configured to display the ultrasound guidance view during needle insertion into the puncture insert 115 and the associated simulated body tissue 122 and simulated blood vessel 124.

As previously described, the first, second, and third imaging devices are configured to capture and record real-time video depicting different views of the anatomical training model 110 for displaying a composite view of the videos on the monitor 200 during a simulated vascular insertion procedure, such as a venipuncture procedure. To produce the composite view, the videos obtained from the first, second, and third imaging devices are fed directly to the monitor 200, and are synced and merged into a single video file for final viewing and evaluation of the insertion procedure. In some aspects, the monitor 200 may be configured to record the composite view of the videos. In other aspects, a screen recording device may be connected to the monitor 200 for recording the composite view of the videos provided by the first, second, and third imaging devices.

The puncture insert 115 is configured to retain transparency in visible light so that the intravascular medical device and simulated blood vessel 124 are visible to the clinician during the insertion procedure. Additionally, the puncture insert 115 has clinically relevant ultrasonic properties (i.e., realistic anatomical features). Thus, the training model is configured to be visible to a clinician and have video recorded in three distinct ways: (1) a video of the insertion site taken by the first imaging device 150 and viewed from outside the synthetic skin 126 covering both the transparent housing 120 and the transparent simulated body tissue 122; (2) a video of the simulated blood vessel 124 taken by the second imaging device 160 and viewed through both a side wall of the transparent housing 120 and the transparent simulated tissue 122; and (3) a video of the simulated blood vessel 124 taken by the third imaging device 170 and viewed using ultrasound.

The puncture insert 115 may be stably yet removably mounted on a support base 130. In some aspects, a light source 112, such as a dimmable light strip, may be mounted directly to the transparent housing 120 of the puncture insert 115 so that the simulated vessel 124 can be sufficiently illuminated to ensure that activity of the medical device within the simulated blood vessel and body tissue can be adequately visualized and recorded. In other aspects, the light source 112 may be mounted on the support base 130 at a location adjacent to the transparent housing 120 for providing sufficient illumination to the simulated blood vessel and body tissue. Additionally, the vascular access training simulator system 100 may include a microphone 180 configured to record a clinician's audible comments and observations during the insertion procedure.

Further, the anatomical training model 110 may comprise an anatomical body part 140, such as an anatomical upper arm model, connected to an end of the transparent housing 120 in order provide a basis for proper orientation of the puncture insert 115 during a vascular insertion procedure. In particular, the anatomical body part 140 is configured to be mounted to the transparent housing 120 in an manner corresponding to an orientation of the synthetic blood vein 124 extending through the transparent housing 120. Such an arrangement is well suited for use with a peripherally inserted central catheter (PICC). It should also be appreciated that the training model 110 may include a variety of anatomical model limbs and body parts 140 connected to the transparent housing 120. For instance, as shown in FIG. 1, an anatomical upper arm model 140 having a clenched first is illustrated, and in FIG. 2, an anatomical upper arm model 140 having an open first is illustrated.

Figure 3:
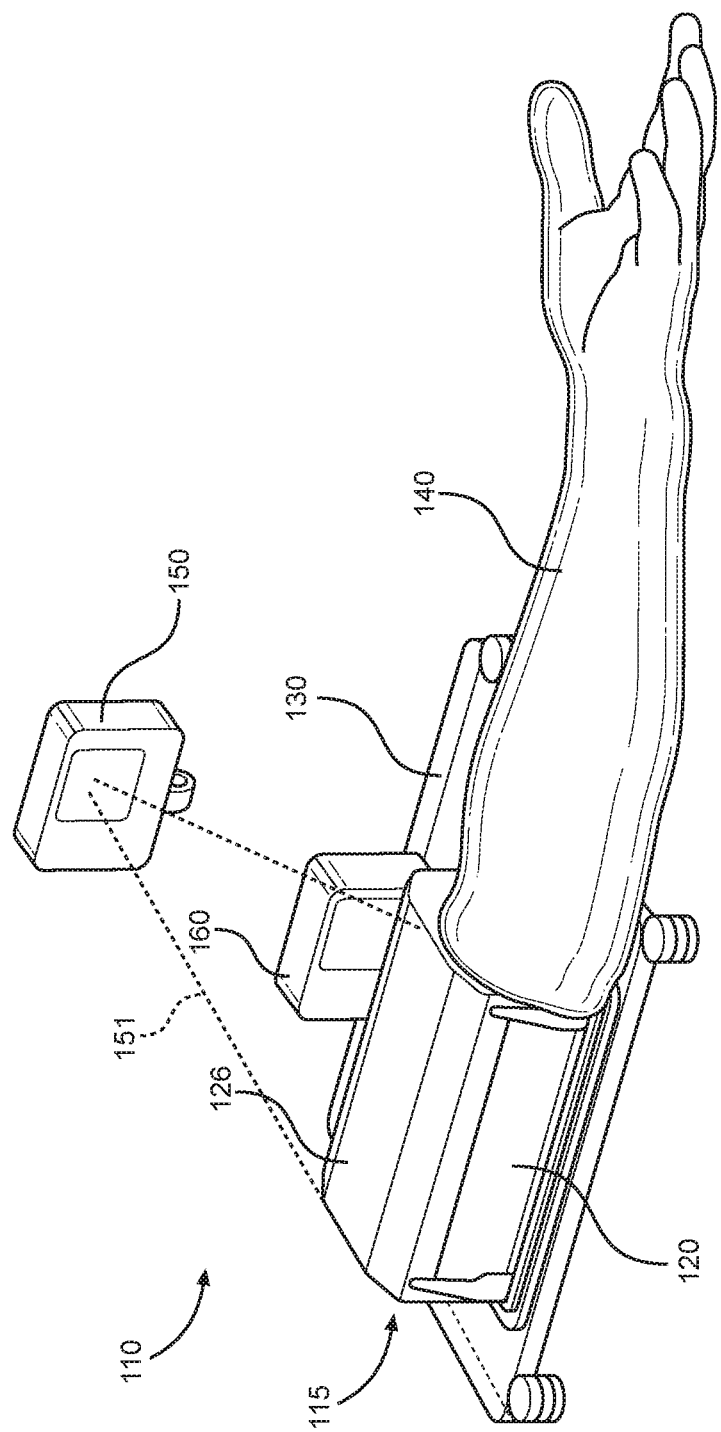
FIG. 3 illustrates a perspective view of an anatomical training model for use with the vascular access training simulator system according to the present disclosure.

FIG. 3 depicts the anatomical training model 110 together with the first and second imaging devices 150, 160 of the vascular access simulator system. The transparent housing 120 and simulated body tissue 122 is covered by a layer of the synthetic skin 126. The first imaging device 150 is configured to point toward a top of the housing 120 and the layer of synthetic skin 126 such that both the clinician's hands and the intravascular device are viewed and recorded during the insertion procedure. The second imaging device 160 is configured to point toward a side of the transparent housing 120 such that a piercing portion of the insertion device is viewed and recorded together with the transparent simulated tissue 122 and the at least one synthetic vein 124.

Figure 4:
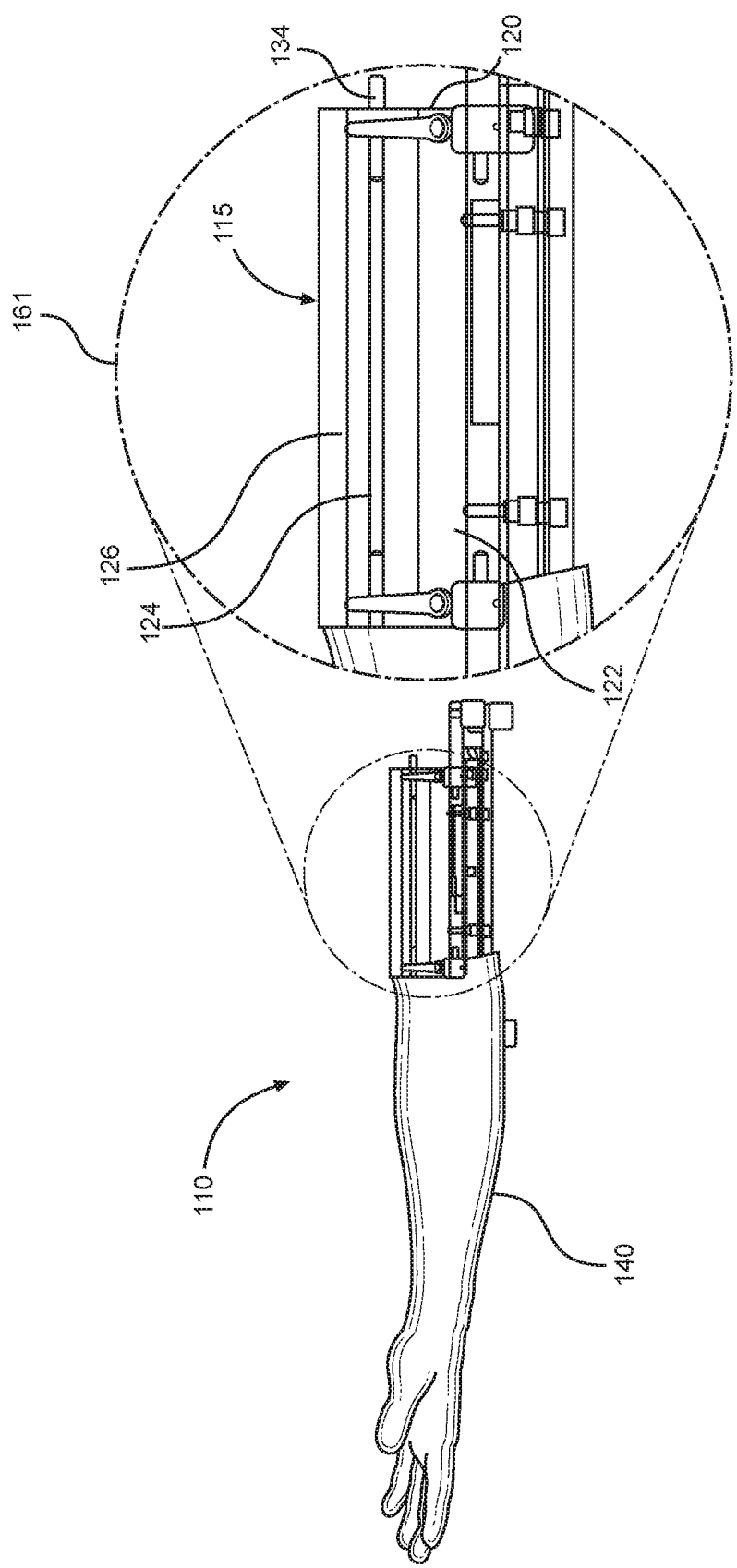
FIG. 4 illustrates a side view of the anatomical training model of FIG. 3, including a close-up side view of a portion of the anatomical training model.
Figure 5:
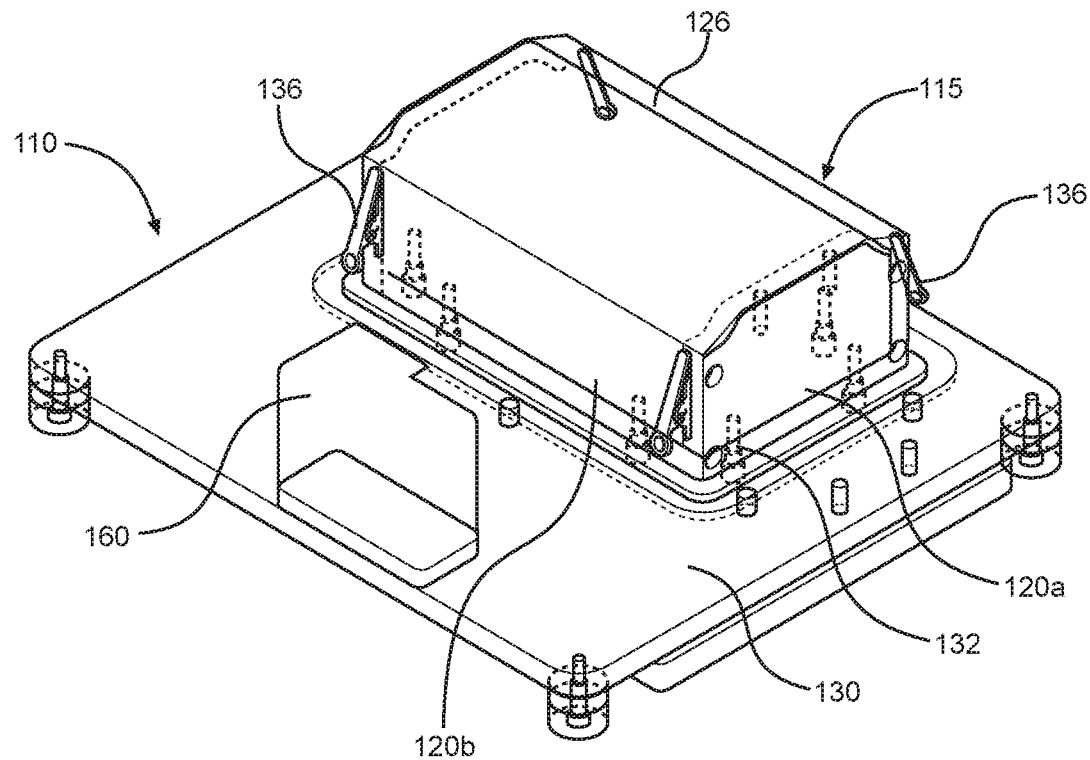
FIG. 5 illustrates a perspective view of an anatomical training model without an anatomical body limb attached thereto, according to the present disclosure.
Figure 6:
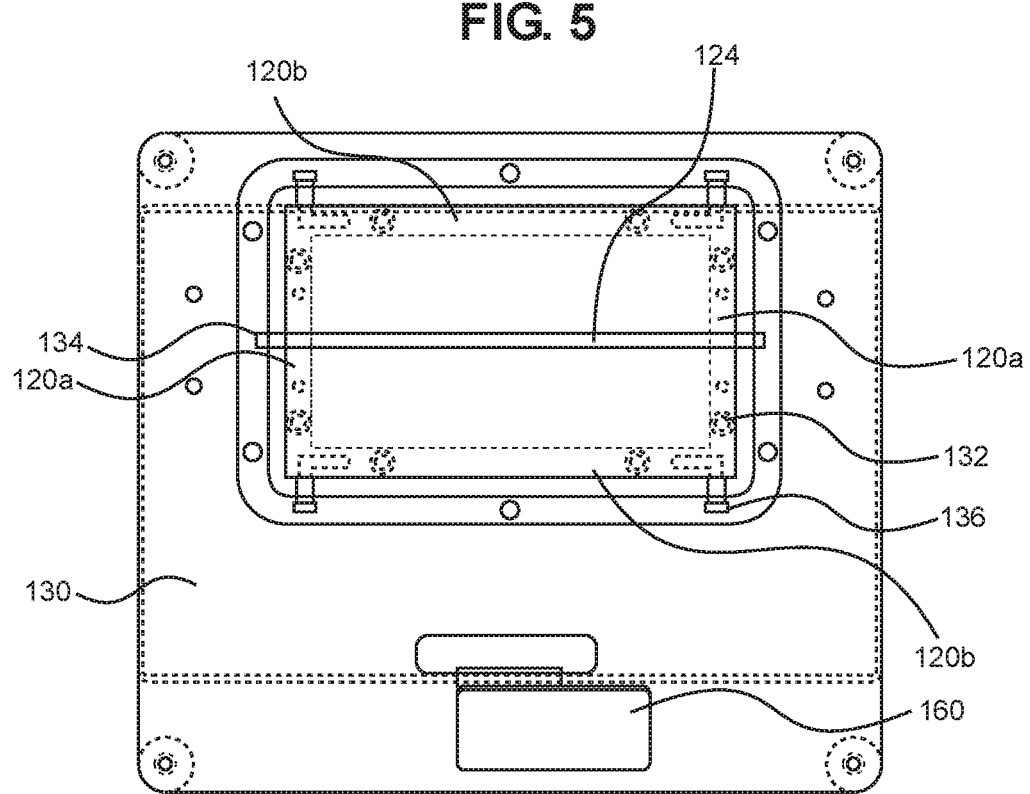
FIG. 6 illustrates a top plan view of the anatomical training model of FIG. 5.
Figure 7:
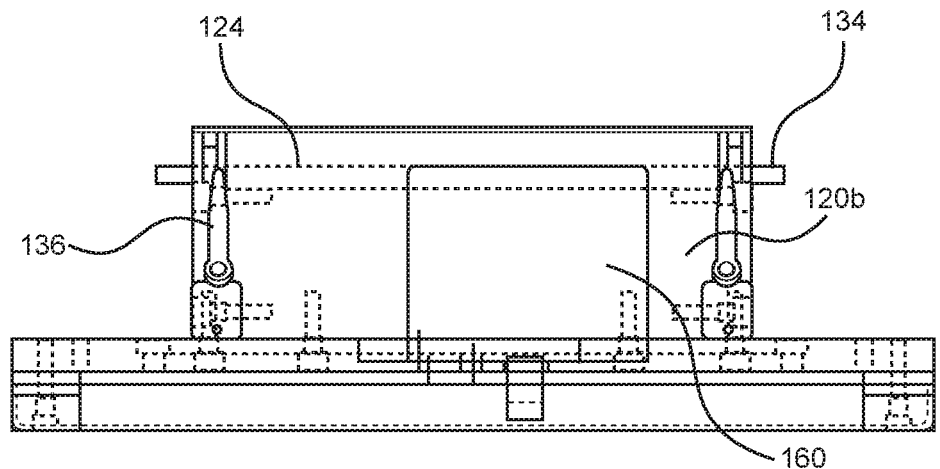
FIG. 7 illustrates a front elevation view of the anatomical training model of FIG. 5.
Figure 8:
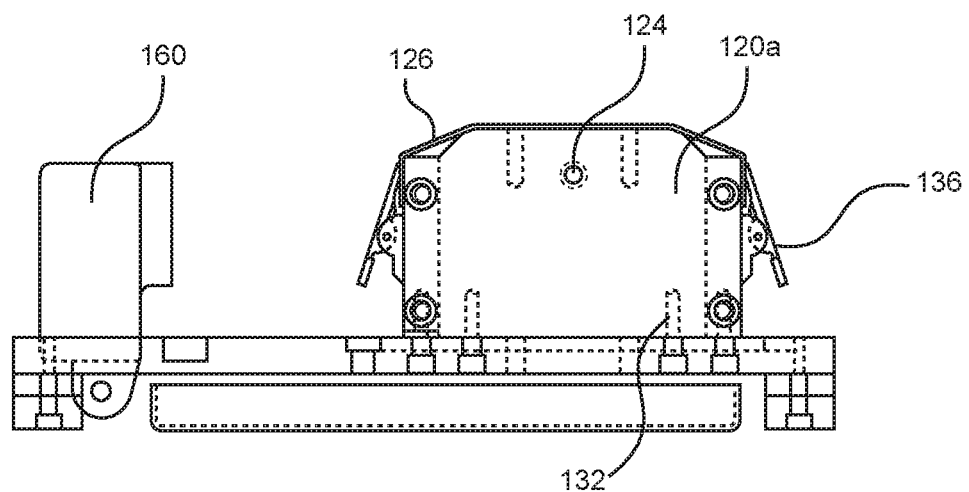
FIG. 8 illustrates a side elevation view of the anatomical training model of FIG. 5.
Figure 9:
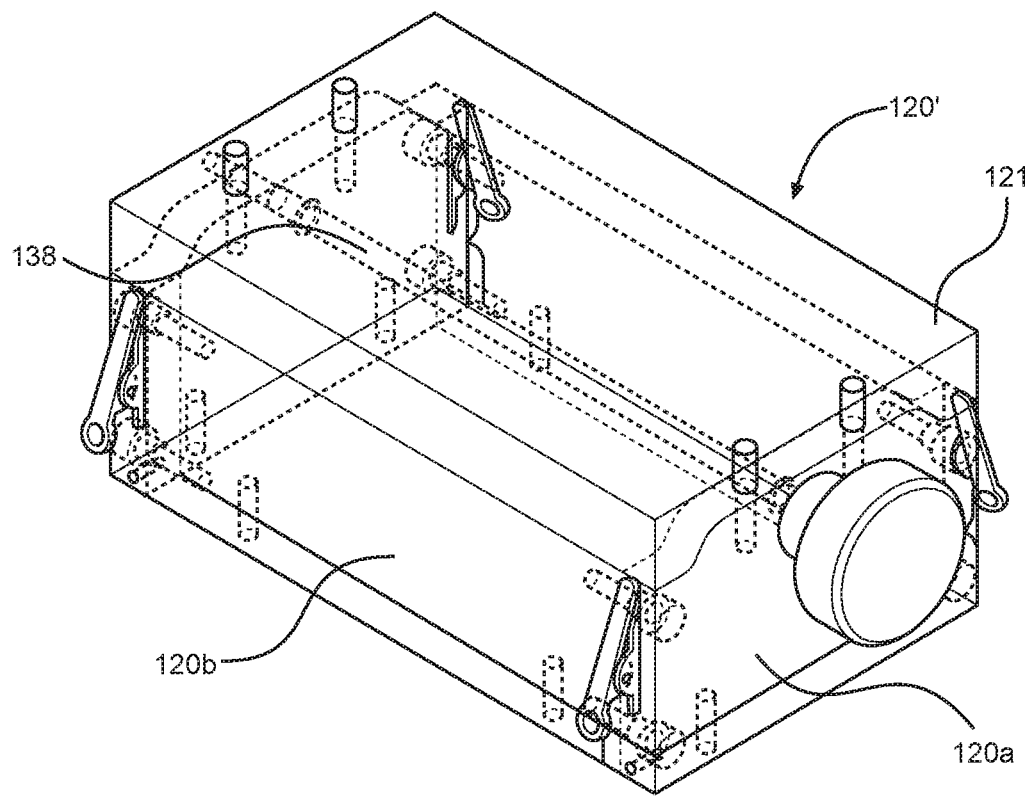
FIG. 9 illustrates a perspective view of a mold used for making an anatomical training model according to the present disclosure.
Figure 10:
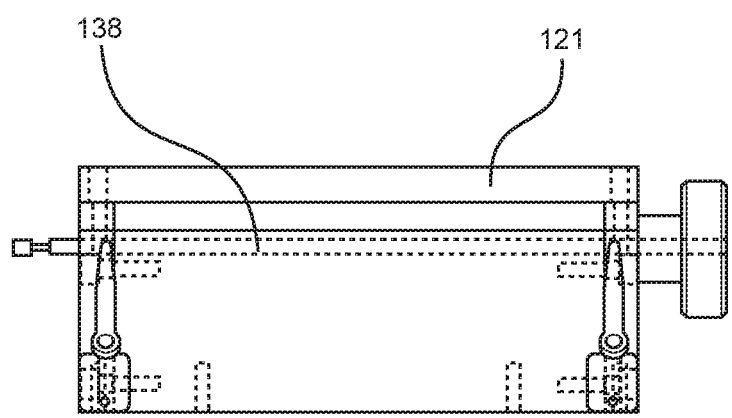
FIG. 10 illustrates a front elevation view of the training model mold of FIG. 9.
Figure 11:
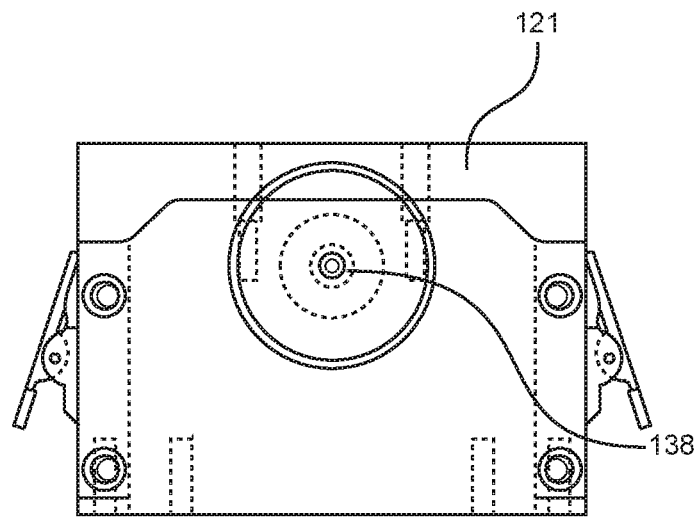
FIG. 11 illustrates a side elevation view of the training model mold of FIG. 9.
Figure 12:
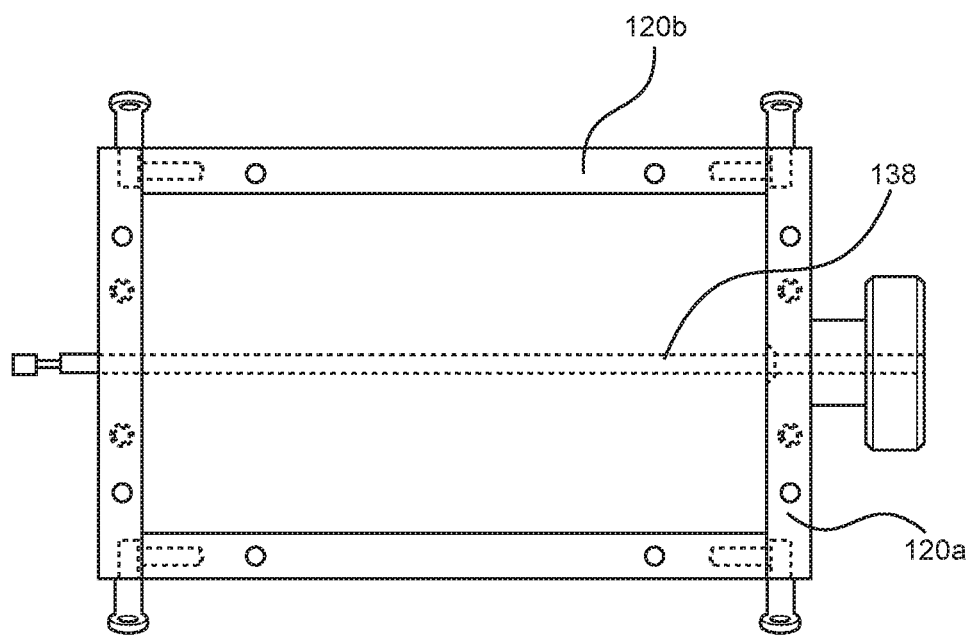
FIG. 12 illustrates a bottom plan view of the training model mold of FIG. 9.

An insertion site view 151 taken from the first imaging device 150 is illustrated in FIG. 3. As shown, the first imaging device 150 is configured to capture a view of the insertion site from outside the synthetic skin 126 covering the top of the transparent housing 120 and the simulated body tissue 122. In order to achieve the insertion site view 151, the first imaging device 150 is raised above the top plane of the transparent housing 120 and pointed toward a needle insertion site on the synthetic skin 126. FIG. 4 depicts a blood vessel view 161 taken from the second imaging device 160. As shown, the second imaging device 160 is configured to capture a view of the simulated blood vessel 124 through the transparent housing 120 and the transparent simulated tissue 122. In order to achieve the blood vessel view 161, the second imaging device 160 is mounted to the support base 130 and pointed toward the simulated blood vessel 124 within the transparent housing 120. Moreover, as shown in FIG. 4, the anatomical body part 140 is mounted to the transparent housing 120 in an anatomical orientation relative to the simulated blood vessel 124.

It should also be appreciated that various types of simulated vasculature of the training model 110 may be provided. For instance, the training model may include a plurality of synthetic veins of various sized diameters. In some implementations, for example, the training model 110 may include vasculature of the lower arm in order to simulate IV procedures. In other implementations, the training model 110 may include vasculature of an anatomical model arm and half a chest that can be used to simulate both PICC and midline procedures. In other implementations, the training model 110 may include an anatomical torso model to simulate central venous catheter (CVC) and hemodialysis procedures.

The synthetic blood vessel 124 is configured to be in fluid communication with a blood analog at venous pressure. The blood vessel 124 includes a blood analog pressure input 134 configured to connect to a fitting, such as a luer fitting, so that a supply of analog blood can pressurize the blood vessel 124. The addition of analog blood to the simulated blood vessel 124 increases ultrasound visibility, and also creates simulated blood flash upon venipuncture.

Referring to FIGS. 5-8, the second imaging device 160 and the transparent housing 120 of the anatomical training model 110 are both shown secured to the support base 130. The layer of synthetic skin 126 covering the top of the housing 120 may be removably secured thereto by a plurality of clip fasteners 136 attached to the housing 120. As noted above, the puncture insert 115 is stably yet removably mounted on a support base 130. In particular, the transparent housing 120 may be removably secured in place on the support base 130 via fasteners 132, such as screws or bolts. Further, the second imaging device 160, which is configured to capture and record a side view of the simulated blood vessel 124 through the transparent housing 120 and the transparent body tissue 122, is shown pivotably connected to the support base 130 in order to provide an adjustable viewing angle.

As previously described, the puncture insert 115 comprises a transparent housing 120 having transparent simulated body tissue and organs 122. The housing 120 includes a first opposing pair of walls 120a, and a second opposing pair of walls 120b that are perpendicularly connected to the first opposing pair of walls 120a by fasteners, such as screws or bolts. In some implementations, the first and second pairs of walls 120a, 120b of the housing 120 form a hollow rectangular encasement configured to contain the transparent simulated body tissue 122, wherein a top of the housing and a bottom of the housing are open to expose the simulated body tissue. The transparent housing 120 further comprises at least one transparent simulated blood vessel 124 and a layer of synthetic skin 126 covering a top of the housing 120 and the simulated body tissue 122. The transparency of the training model 110 allows the clinician, as well as additional observers, to view underneath the surface of the synthetic skin 126 during or after a venipuncture procedure in order to provide feedback to the clinician, while still closely replicating needle insertion into human tissue and organs.

The simulated tissue and organs 122 of the puncture insert 115 comprise a transparent tissue-mimicking gelatin configured to imitate the ultrasound properties of human tissue, the stiffness and feel of human tissue, and the penetration forces and characteristics of human tissue during venipuncture. This tissue-mimicking gelatin, or ballistic gel, maintains the desired transparency while also simulating human subcutaneous fat and connective tissue. The simulated tissue material 122 may comprise a mixture of layers with various geometries having different concentrations and/or formulations of the tissue materials in order to simulate different ultrasonic acoustic and optical properties. The simulated tissue material also allows for repeated sticks of the vascular access device.

A process for making the puncture insert 115 includes using a mold block 120' comprising a rectangular polycarbonate resin, such as Lexan™, having a curved removable lid 121. As shown in FIGS. 9-12, the mold also includes a solid rod 138 for creating a cavity for the simulated vessel 124 after molding. The process comprises pouring molten simulated tissue material into the mold from an open bottom section over the solid rod 138. Air is removed from the simulated tissue 122 via a vacuum oven prior to molding in order to prevent the formation of air bubbles which can obstruct the view of the camera and create ultrasound artifacts.

All tissue material layers use a base material of Perma-Gel ballistics gel medium comprising white mineral oil and 2,6-di-tert-butyl-p-cresol mixed with 10-40% by weight mineral oil light. In one implementation, 25% by weight mineral oil light may be used. During testing, this concentration was found to exhibit representative needle penetration values when compared to human tissue at room temperature. Various combinations of two types of Poly(methyl methacrylate) (PMMA) are added to create the different clinically relevant ultrasonic acoustic and optical properties of the gel layers (refer to Table 1 shown below). In some implementations, PMMA beads having an average MW of 35,000 and typical particle size of 50 to 150 micron are used. In other implementations, powdered PMMA may also be used to simulate the sonographic characteristics of living tissue. In still other implementations, the transparent simulated tissue, the simulated blood vessel, and/or the simulated skin layer have clinically relevant ultrasonic properties corresponding to ultrasonic properties of a human body site for ultrasound imaging.

TABLE 1

Combinations of Tissue Material Layers

| Description of Tissue Material Layer | Simulated Tissue | Material Composition | Critical Ultrasonic and Optical Properties |
|---|---|---|---|
| White Connective Streaks | Connective tissue present in subcutaneous fat between the epidermis/dermis and target vessel | Base material with PMMA powder added at a concentration of between 2-10% of gel weight (i.e., 5% of gel weight) | Hyperechoic (brighter, white) under ultrasound; translucent |
| White/Clear Layer Potting Vessel | Connective tissue surrounding vessel | Base material with PMMA beads added at a concentration of between 0.1-1% of gel weight (i.e., 0.45% of gel weight) | Hyperechoic (brighter, white) under ultrasound; transparent |
| Gray/Black Primary Material | Contrasting subcutaneous fat layers | Base material with PMMA powder added at a concentration of between 0.1-1% of gel weight (i.e., 0.3% of gel weight) | Anechoic (black); translucent |

After the molten simulated tissue 122 is added to the mold block 120', it is cooled and then the rod 138 is removed from the block to leave an opening for the simulated blood vessel 124 to be suspended in the simulated tissue 122. The simulated vessel 124 may be a synthetic vein tube having properties that simulate living tissue. The curved lid 121 is then removed and the mold block 120' is inverted to create a curvature that mimics the curvature of a body part, such as an arm. This also allows for the clinical practice of compressing the vessels with the ultrasound probe, which is a technique clinicians can use during venipuncture to distinguish between veins, which compress, and arteries, which do not compress. Once the lid 121 is removed, the polycarbonate resin mold 120' forms the training model housing 120, which contains the simulated vessel 124 and simulated tissue 122. The housing may then be attached to the support base 130 via fasteners, such as screws or bolts. Similarly, an anatomical body part 140, such as a mannequin arm, may then be attached to the housing 120 to assist with orientation as previously described. The layer of synthetic skin 126 is then clipped onto the top of the housing 120 by using fastening clips 136 attached to side walls of the housing.

Figure 13:
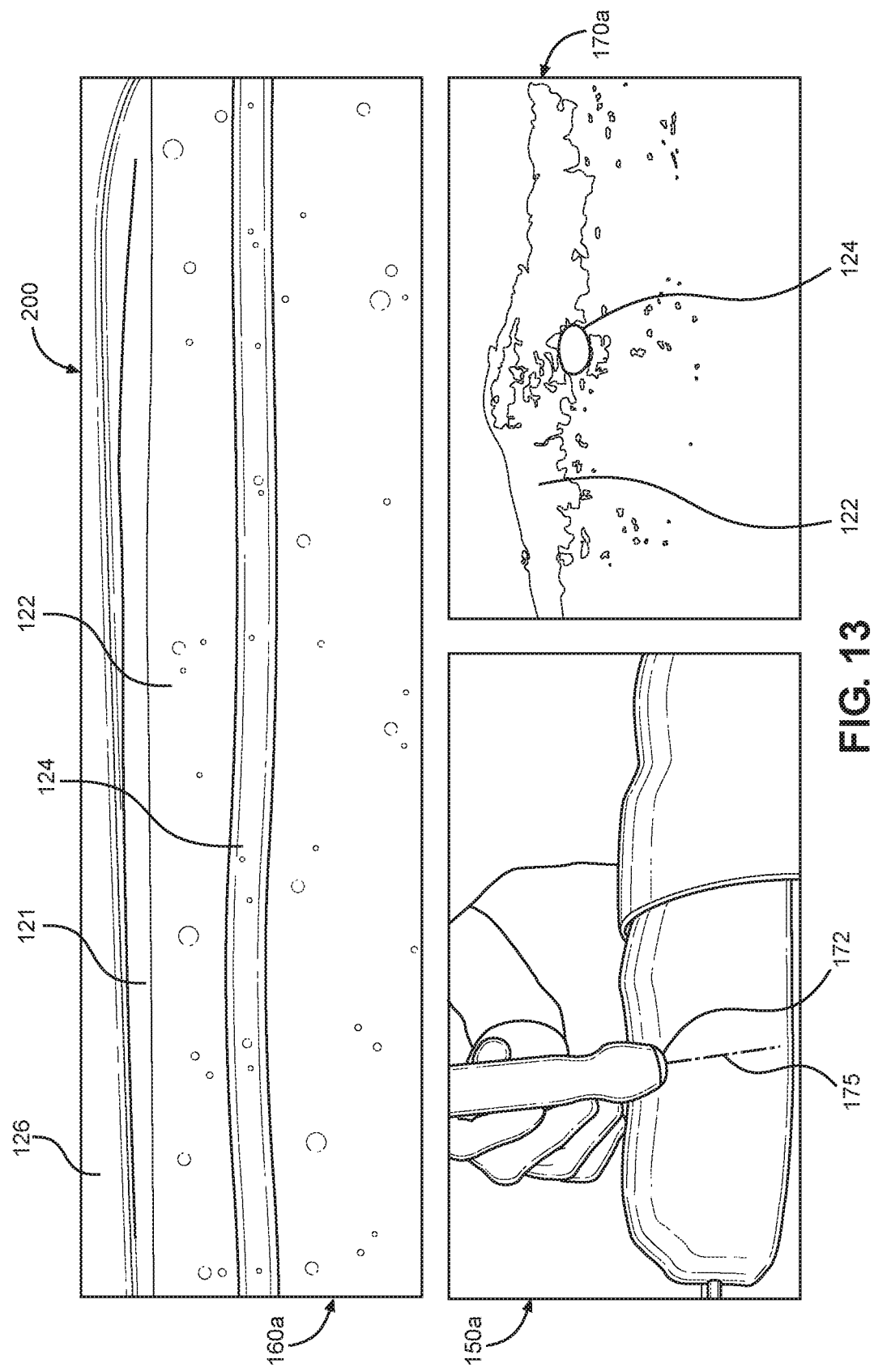
FIG. 13 illustrates a video recording output displayed to a user during or after a simulated venipuncture procedure according to the present disclosure.

Turning to FIG. 13, the display screen or monitor 200 shows a real-time view or recording of a composite image formed from the first, second, and third imaging devices of the vascular access training simulator system. As previously described above, the three imaging devices are arranged to provide the clinician with different types of images and viewpoints. Further, each video image is displayed simultaneously on a single display screen. For instance, the first imaging device 150 is configured to capture a view of the clinician's hands during the training procedure, which is depicted in a first section 150a of the display screen 200.

The first imaging device 150 is configured to capture video of the clinician holding both the ultrasound imaging probe 172 as well as an intravascular medical device, such as a catheter insertion needle. The second imaging device 160 is configured to capture a side view of the synthetic vessel 124 inside the anatomical model as viewed through the transparent housing 120 and the transparent simulated tissue 122, which is depicted in a second section 160a of the display screen 200. The third imaging device 170 is arranged to capture a recording of the ultrasound monitor's image of the anatomic model along an ultrasound plane 175, which is depicted in a third section 170a of the display screen 200. The vascular access training simulator system is further configured to sync and merge the three separate video recordings into a single video file for final viewing and evaluation of the insertion procedure.

Figure 14:
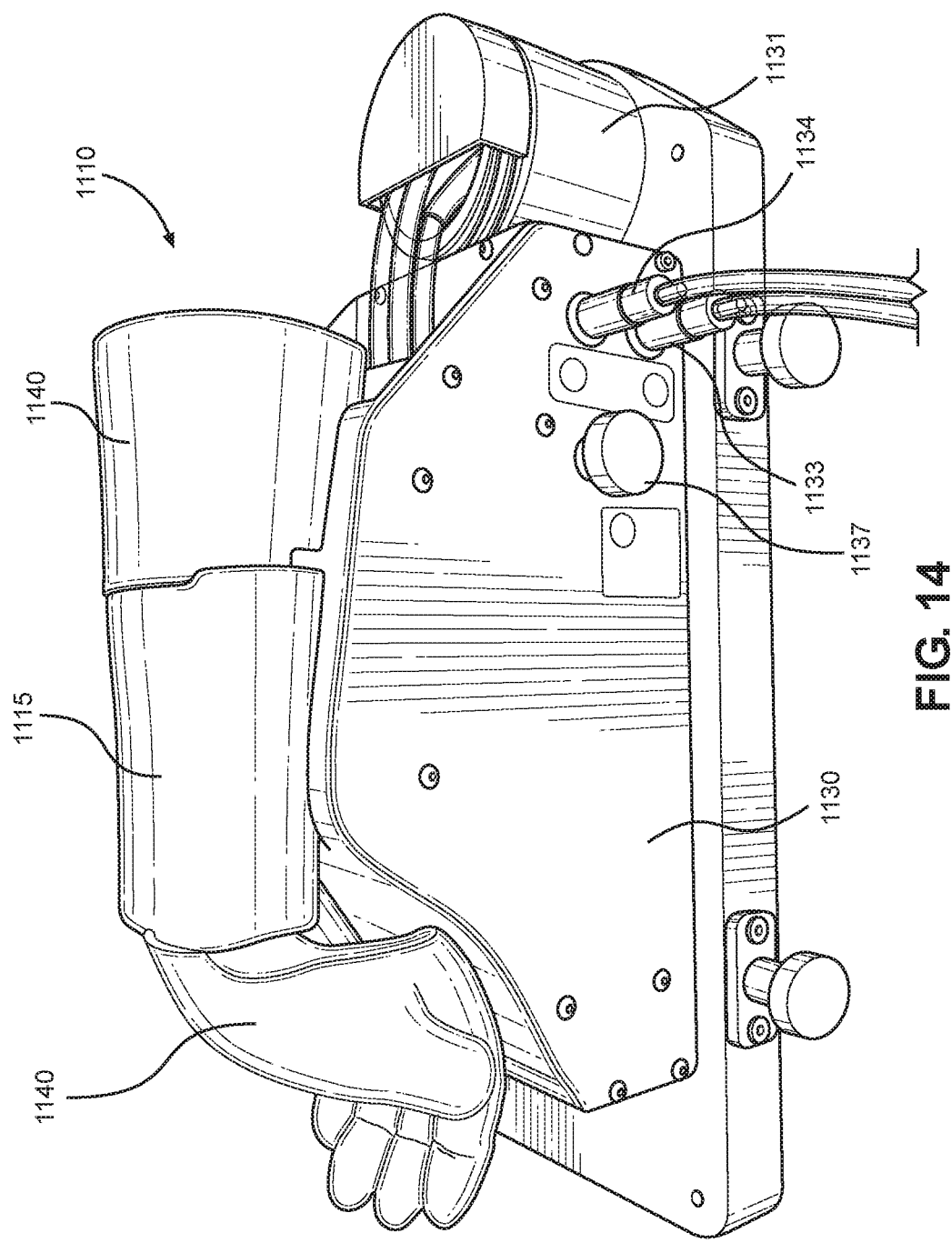
FIG. 14 illustrates a side perspective view of another implementation of an anatomical training model for use in a vascular access training simulator system according to the present disclosure.
Figure 15:
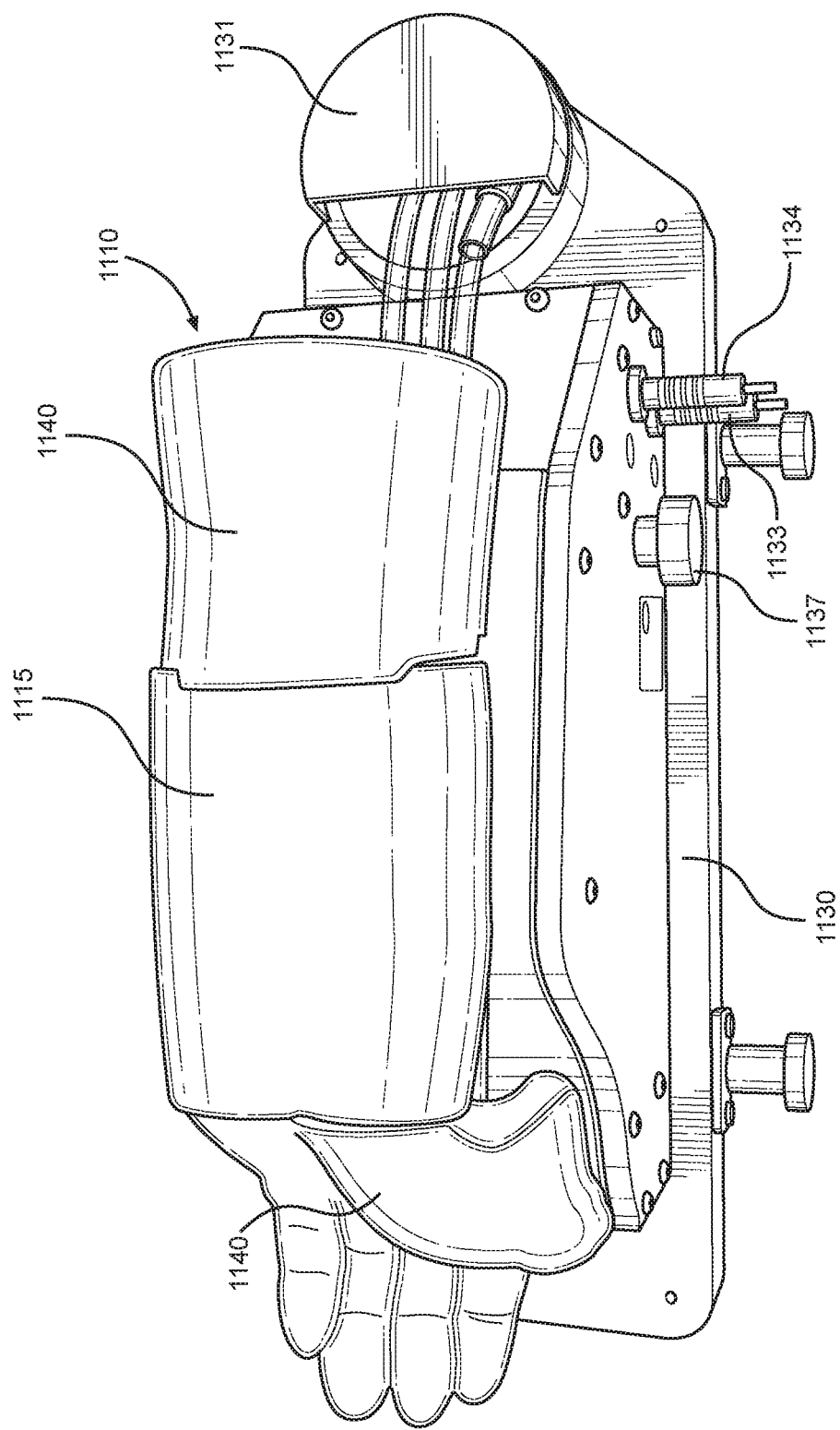
FIG. 15 illustrates an overhead perspective view of the anatomical training model depicted in FIG. 14.

Turning to FIGS. 14 and 15, another implementation of an anatomical training model 1110 of a vascular access training simulator system is depicted. The anatomical training model 1110 may be configured to mimic venipuncture and/or radial arterial insertion of a medical device, such as a needle. The anatomical training model 1110 comprises an anatomical puncture insert 1115, a support base 1130, and an anatomical model limb 1140. The anatomical model limb 1140, such as a model hand, is removably attachable to the puncture insert 1115 to provide a basis for proper orientation of the puncture insert. As will be discussed below in greater detail, the puncture insert 1115 comprises a transparent housing 1120, a transparent simulated body tissue 1122, a simulated blood vessel 1124, and a layer of synthetic skin 1126. Further, the puncture insert 1115 is removably attachable to the support base 1130 so that it can be replaced with a new insert as needed after several insertions of the needle into the simulated artery and tissue have been performed.

Similar to the training simulator system previously described above, a first imaging device 1150, such as a first digital video camera, is configured to capture and record a video showing a view of the clinician's hands during the insertion procedure. A second imaging device 1160, such as a second digital video camera, is configured to capture and record a video showing a close-up view of the simulated blood vessel 1124 extending through the transparent housing 1120 and the transparent simulated body tissue and organs 1122. The first imaging device 1150 is configured to point toward an outer top surface of the puncture insert 115 such that the layer of synthetic skin 1126, the clinician's hands, and the intravascular device are all viewed and recorded during the insertion procedure. The second imaging device 1160 is provided in a compartment of the support base 1130, as will be discussed in greater detail below.

The support base 1130 comprises a stabilizing plate, a stabilizing stand, and a fluid reservoir 1131 configured that hold a supply of fluid, such as synthetic blood. The support base 1130 also includes a flow outlet 1133 and a flow inlet 1134. The flow outlet 1133 is in fluid communication with the fluid reservoir 1131 and a pulsatile arterial simulation pump. The flow inlet 1134 is in fluid communication with the pulsatile pump and the simulated blood vessel 1124 of the puncture insert 1115.

As shown in FIGS. 14 and 15, the anatomical model limb 1140 comprises a model hand attached to the puncture insert 1115 in a flexed position to simulate radial artery puncture. In this arrangement, the anatomical puncture insert 1115 is a simulated forearm, and the simulated blood vessel 1124 within the simulated forearm is a simulated artery. The simulated forearm extends about 3.5 inches in length from the wrist of the anatomical body part 1140, which represents the location where the radial artery is most superficial and used for radial artery catheterization.

To mimic a radial arterial insertion, the flow of synthetic blood through the simulated blood vessel 1124 of the puncture insert 1115 is pressurized by the pulsatile pump to provide a palpable pulsatile flow. Accordingly, the pulsatile pump is configured to draw simulated blood from the reservoir 1131 and into the pump via the flow outlet 1133, and pump the simulated blood through the simulated blood vessel 124 via the flow inlet 1134 before returning the simulated blood back to the fluid reservoir. Flexible fluid tubing, such as transparent silicon tubing, may be used to transport the simulated blood through the system. The pulsation of the simulated blood sent from the pulsatile pump through the simulated blood vessel 1124 mimics the flow of blood through an artery. Consequently, expansion of the pressurized simulated artery can be felt by the clinician through the simulated tissue 1122 and the synthetic skin cover 1126 of the puncture insert 1115. This tactile response helps the clinician locate the simulated artery in the forearm. Further, the pulse of the simulated blood flow can be adjusted by compressing the connector tubing via an adjustment knob 1137.

Figure 16:
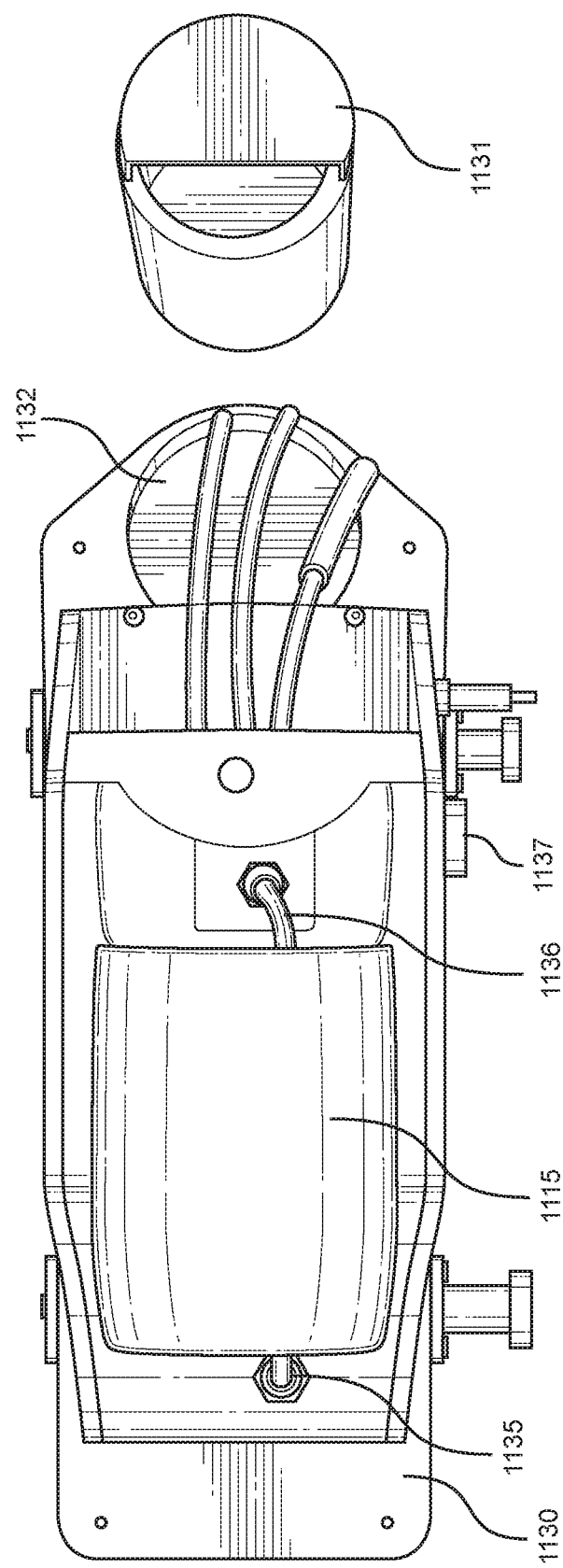
FIG. 16 illustrates a top plan view of the anatomical training model depicted in FIG. 14, without an anatomical body limb attached thereto, according to the present disclosure.
Figure 17:
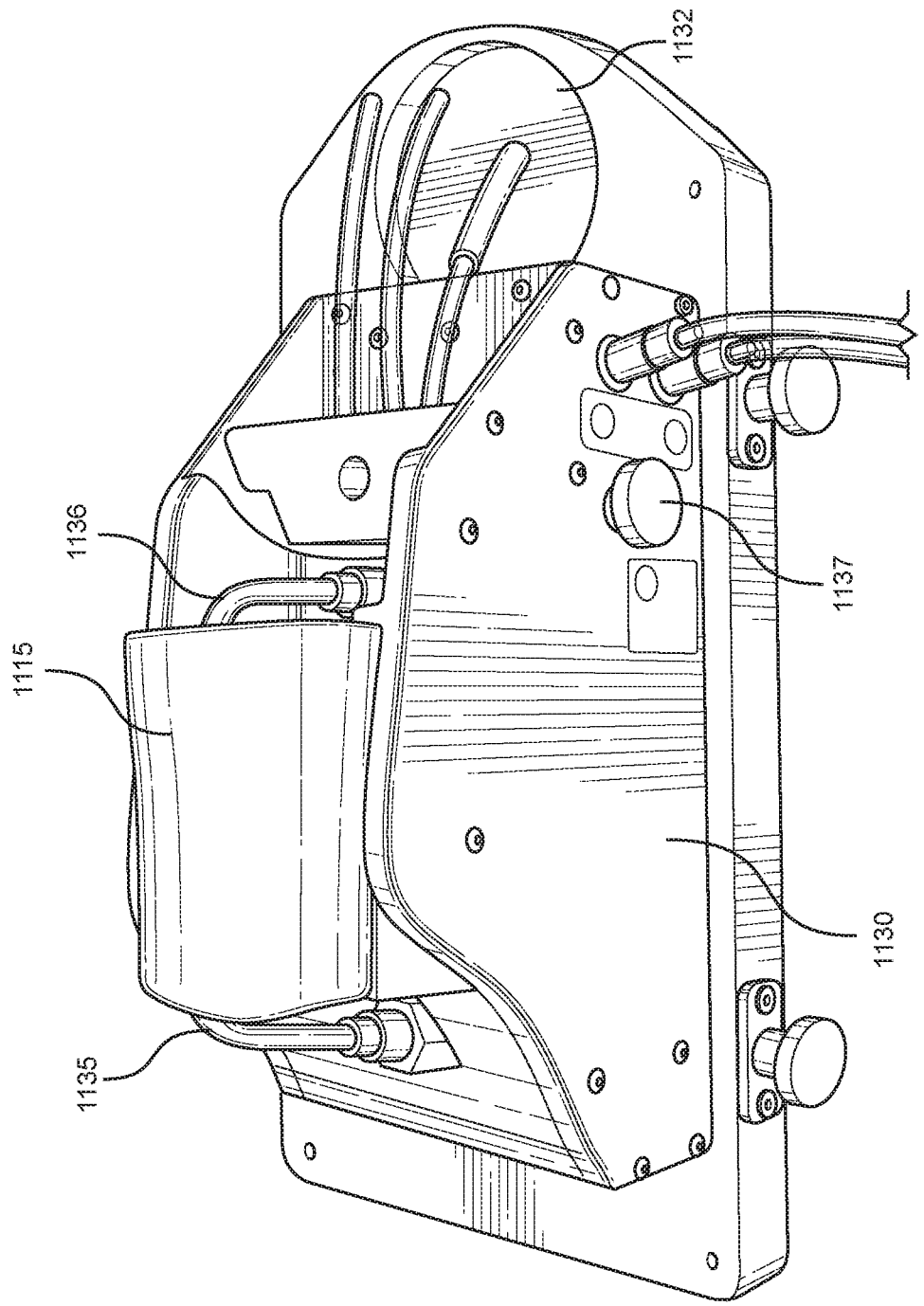
FIG. 17 illustrates a side perspective view of the anatomical training model depicted in FIG. 16.

Referring to FIGS. 16 and 17, the anatomical training model is depicted with the anatomical model limb detached from the puncture insert 1115. A blood vessel inlet tubing 1135 is connected to a blood vessel inlet end of the simulated blood vessel 1124 within the puncture insert 1115, and a blood vessel outlet tubing 1136 is connected to a blood vessel outlet end of the simulated blood vessel within the puncture insert. The blood vessel inlet and outlet tubes 1135, 1136 may be molded to the blood vessel inlet and outlet ends, respectively, of the simulated blood vessel. Additionally, the support base 1130 includes a recess 1132 configured to removably receive the fluid reservoir 1131.

Figure 18:
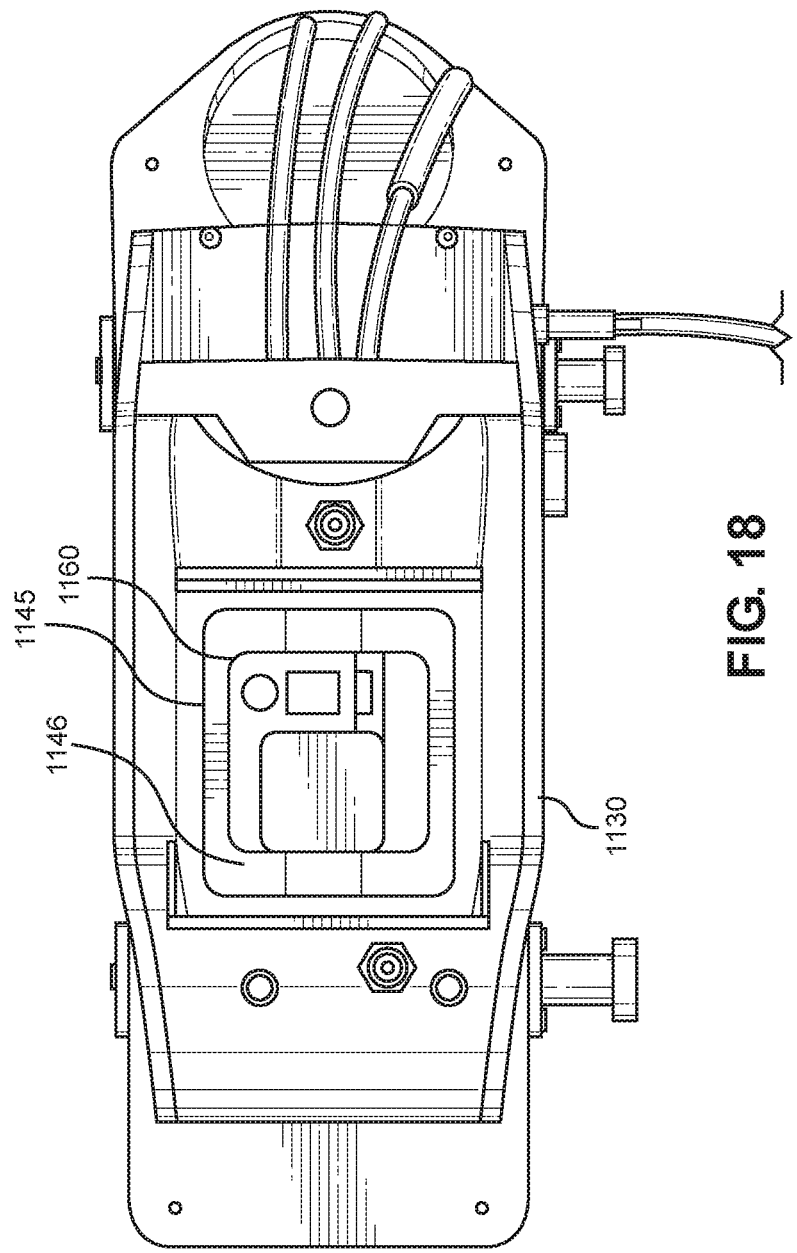
FIG. 18 illustrates a top plan view of the anatomical training model depicted in FIG. 16, without a puncture insert attached thereto, according to the present disclosure.

A compartment 1145 is provided within the support base 1130 and located directly underneath the puncture insert 1115. The location of the compartment 1145 is shown in FIG. 18, in which the puncture insert is removed from the support base 1130. The compartment 1145 is configured to removably receive the second imaging device 1160 in an orientation pointing upward, i.e., toward a bottom surface of the puncture insert when the puncture insert is attached to the support base. A transparent protective barrier 1146, such a clear acrylic sheet, covers the compartment 1145. The protective barrier 1146 is configured to provide the compartment with a water-tight seal in order to prevent fluid or dirt or debris from damaging the second imaging device 1160 and/or blocking a view of the video obtained from the second imaging device. The compartment 1145 may include a drainage tube inlet configured drain away any fluid that enters the compartment.

Figure 19:
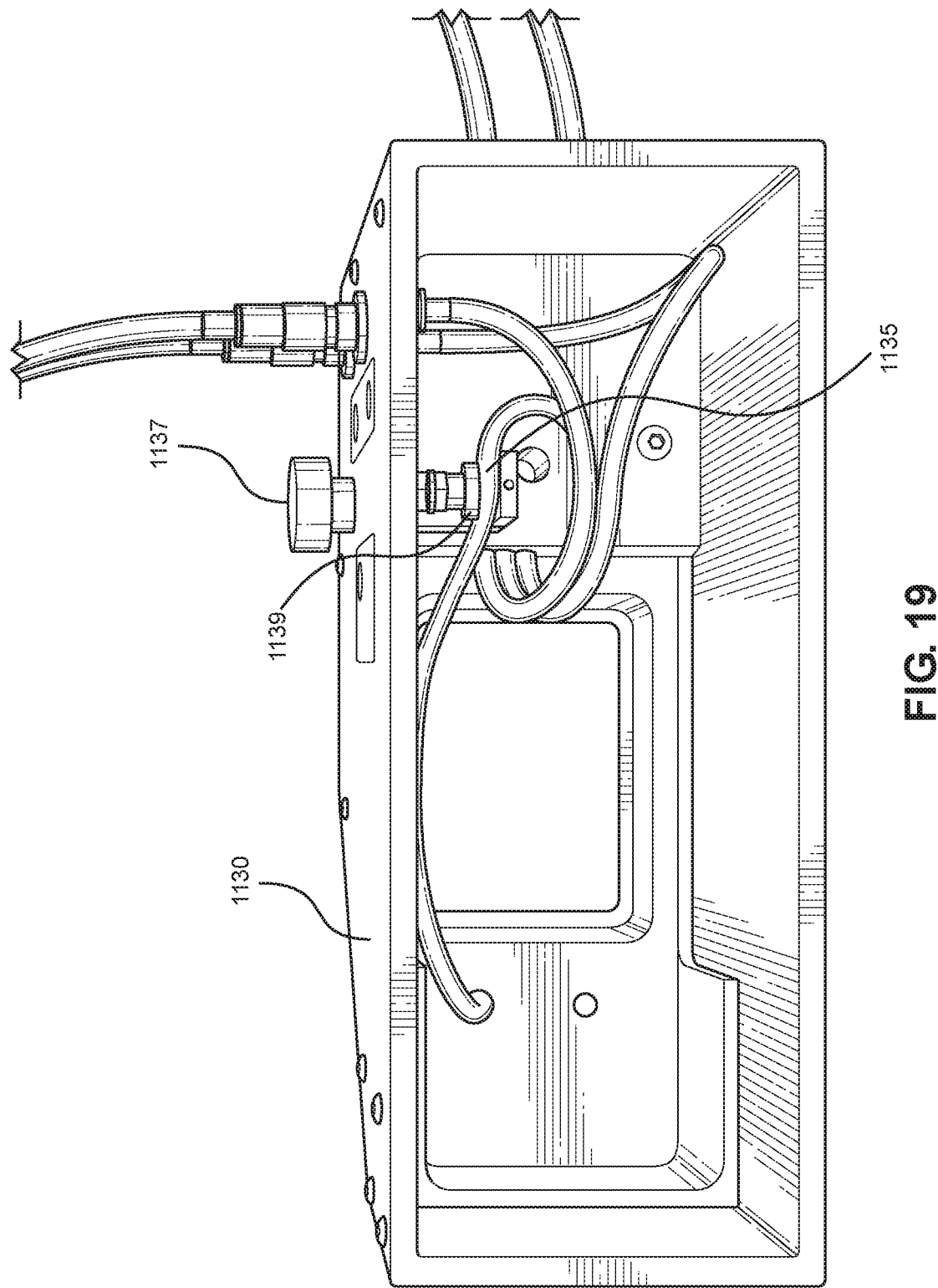
FIG. 19 illustrates a bottom view of a portion of a support base of the anatomical training model depicted in FIG. 17.

An underside view of a portion of the support base 1130 is shown in FIG. 19. A compression member 1139, such as an adjustable clamp, is shown connected to the adjustment knob 1137 and is configured to selectively compress a section of the blood vessel inlet tubing 1135 when the adjustment knob is turned. Thus, a user is able to adjust the pulse of simulated blood flow through the simulated blood vessel 1124 by manipulating the adjustment knob 1137 to adjust the amount of compression applied by the clamp 1139 to the vessel inlet tubing 1135.

Figure 20:
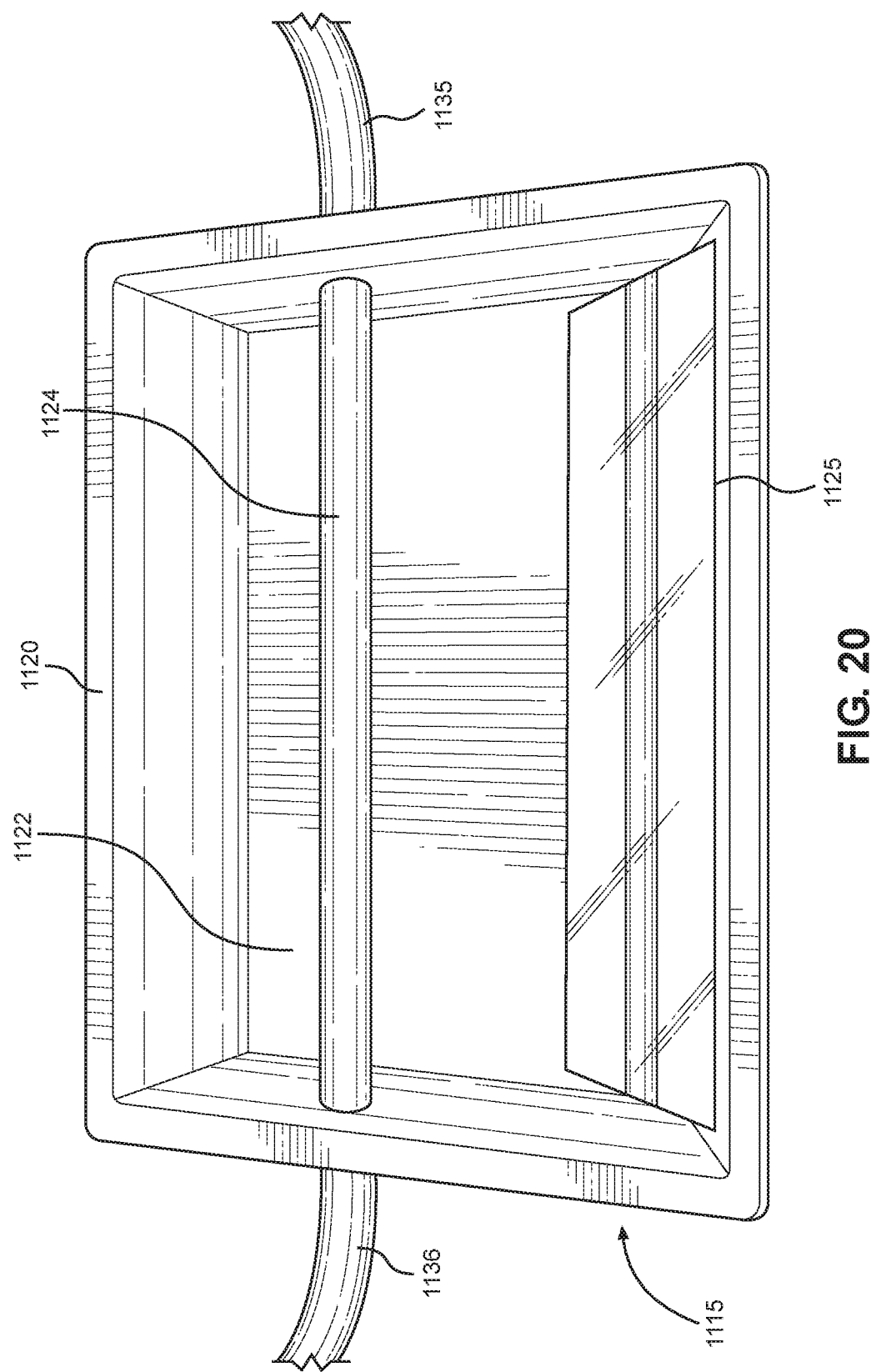
FIG. 20 illustrates a bottom view of the puncture insert of the anatomical training model depicted in FIG. 14.

An underside view of the puncture insert 1115 is shown in FIG. 20, in which the transparent housing 1120, the transparent simulated body tissue 1122, and the simulated blood vessel 1124 are all depicted. As similarly described in detailed above, the simulated body tissue 1122 of the puncture insert 1115 comprises a transparent tissue-mimicking gelatin configured to imitate properties of human tissue. Such properties include the stiffness and feel of human tissue, the penetration forces and characteristics of human tissue during needle puncture, and the ultrasound properties of human tissue, among others. The tissue-mimicking gelatin, or ballistic gel, maintains the desired transparency while also simulating human subcutaneous fat and connective tissue. The simulated tissue material 1122 may comprise a mixture of layers with various geometries having different concentrations and/or formulations of the tissue materials in order to simulate different properties while also allowing for repeated sticks of the insertion device.

Figure 21:
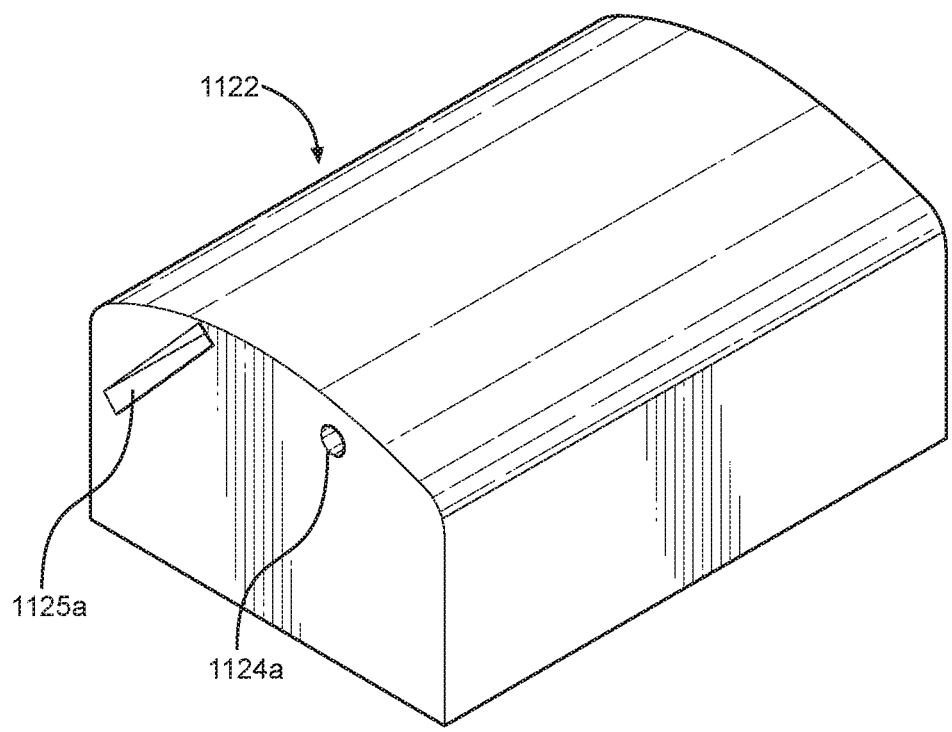
FIG. 21 illustrates a perspective view of a portion of the puncture insert depicted in FIG. 20.
Figure 22:
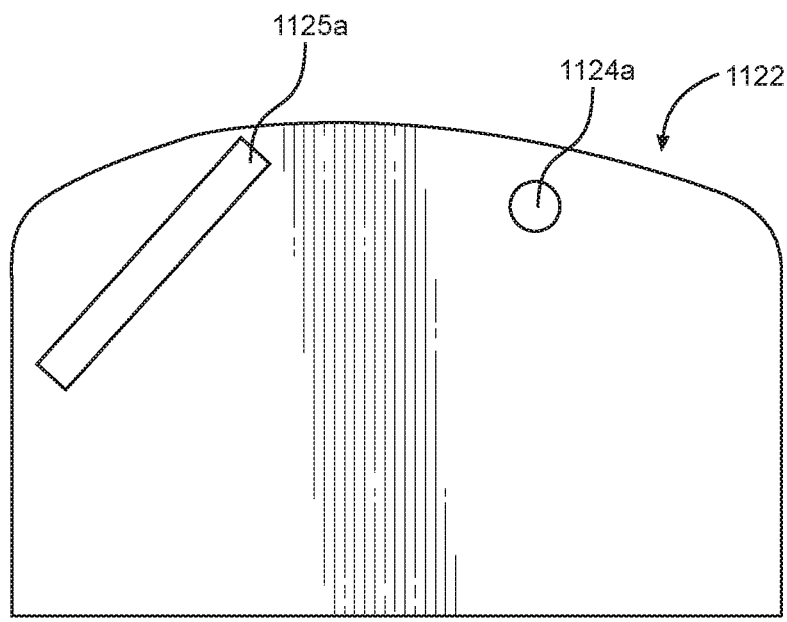
FIG. 22 illustrates a front elevation view of the portion of the puncture insert of FIG. 21.

The puncture insert 1115 shown in FIG. 20 comprises a simulated artery 1124, which may include a transparent silicon tubing that is molded within the clear tissue-mimicking gelatin of the simulated body tissue 1122. The simulated artery 1124 includes an inlet end that is in fluid communication with the blood vessel inlet tubing 1135, and an outlet end that is in fluid communication with the blood vessel outlet tubing 1136. Additionally, a mirror 1125 is implanted within the clear ballistic gel at approximately a 45 degree angle relative to a sidewall of the transparent housing 1120. The angled mirror 1125 allows for the second imaging device 1160, which is provided within the support base 1130 and located below the bottom surface of the puncture insert 1115, to capture and record a side view of the simulated vessel 1124 during an insertion procedure. Additionally, the location of the second imaging device 1160 also allows for a direct view of the bottom of the simulated vessel 1124 to be captured and recorded during an insertion procedure. The bottom surface of the puncture insert 1115 defines a transparent floor that allows for the second imaging device 1160 housed inside the support base 1130 to capture the side view of the simulated vessel via the mirror 1125, as well as the bottom view of the vessel via direct line-of-sight. FIGS. 21 and 22 depict the simulated body tissue 1222 without the transparent housing in which its contained. As shown, a vessel through-hole 1124a is provided in the simulated body tissue 1222 and configured to receive the simulated blood vessel 1124. A mirror through-hole 1125a is similarly provided in the simulated body tissue 1222 and configured to receive the mirror 1125.

The video captured and recorded from the first and second imaging devices 1150, 1160 may be displayed in real-time on a display screen or monitor 2000, as depicted in FIG. 23. In particular, the display monitor 2000 is configured to show a real-time video or a pre-recorded video of a composite view formed from the videos captured by the first and second imaging devices. Thus, both imaging devices are configured to provide the clinician with different types of video images and viewpoints, and each video image may be displayed simultaneously on a single display screen. For example, the separate video recordings taken by the first and second imaging devices 1150, 1160 may be synced and merged into a single video file for final viewing and evaluation of the insertion procedure on the single display screen.

The first imaging device 1150 is configured to capture a view of the clinician's hands and the intravascular medical device relative to the insertion site during the training procedure, which is depicted in a first section 1150a of the display screen 2000. The second imaging device 1160 is configured to capture a side view of the synthetic vessel 1124 inside the anatomical model as viewed through the transparent housing 1120 and the transparent simulated tissue 1122, which is depicted in a second section 1160a of the display screen 2000. The second section 1160a of the display screen further includes both the bottom view 1161 of the simulated vessel 1124 as well as the side view 1162 of the simulated vessel via the mirror 1125.

According to other aspects of the anatomical training model, an ulnar artery may be simulated by continuing the pulsatile flow and looping the silicon fluid tubing inside the puncture insert to allow for the clinician to simulate an "Allen Test" prior to insertion. Such an arrangement may be used to confirm whether the ulnar artery supply to the hand is sufficient so that the radial artery can be cannulated and catheterized. In other aspects, the anatomical training model may include both a simulated vein and a simulated artery. Further, the anatomical training model may include other anatomical features, such as nerves, muscles, and bones.

The many features and advantages of the vascular access training simulator system and anatomical training model are apparent from the detailed specification, and thus, the claims cover all such features and advantages within the scope of this application. Further, numerous modifications and variations are possible. As such, it is not desired to limit the vascular access training simulator system and anatomical training model to the exact construction and operation described and illustrated. Accordingly, all suitable modifications and equivalents may fall within the scope of the appended claims.

What is claimed is:

1. A training simulator system for simulating intravascular insertion of a medical device, the system comprising:
   an anatomical training model comprising a puncture insert configured to simulate vasculature of a patient, the puncture insert including a transparent housing configured to contain a transparent simulated body tissue, a transparent simulated blood vessel suspended in the simulated body tissue, and a layer of simulated skin covering a portion of the transparent simulated body tissue;
   a first imaging device configured to take a first video depicting a view of an insertion site on an outer surface of the puncture insert from outside the simulated skin covering the portion of the transparent simulated body tissue;
   a second imaging device configured to take a second video depicting a view of the transparent simulated blood vessel through both a side wall of the transparent housing and the transparent simulated body tissue; and
   a monitor configured to display a composite view of the first and second videos simultaneously in real-time.

2. The training simulator system according to claim 1, further comprising a third imaging device configured to take a third video depicting an ultrasound view of the simulated blood vessel and the simulated body tissue.

3. The training simulator system according to claim 2, wherein the monitor is further configured to display a composite view of the first, second and third videos simultaneously in real-time.

4. The training simulator system according to claim 2, further comprising a handheld ultrasound probe.

5. The training simulator system according to claim 1, wherein the anatomical training model has clinically relevant ultrasonic properties representative of ultrasonic properties of a human body site for ultrasound imaging.

6. The training simulator system according to claim 1, wherein the simulated body tissue includes clinically relevant ultrasonic acoustic and optical properties.

7. The training simulator according to claim 1, wherein the simulated body tissue comprises a colloidal suspension of a ballistic gel and poly(methyl methacrylate) (PMMA).

8. The training simulator system according to claim 1, wherein the anatomical training model further comprises an anatomical body part attached to the puncture insert and configured to provide a proper orientation for the puncture insert.

9. The training simulator system according to claim 1, wherein the anatomical training model further comprises a support base configured to stably and removably secure the puncture insert in a predetermined orientation.

10. The training simulator system according to claim 9, wherein the second imaging device is attached to the support base.

11. The training simulator system according to claim 1, wherein the simulated blood vessel is configured to receive a blood analog at venous pressure.

12. The training simulator system according to claim 1, further comprising a pulsatile pump in fluid communication with the simulated blood vessel for pumping a pulsating flow of blood analog through the simulated blood vessel.

13. The training simulator system according to claim 12, wherein a support base further comprises an adjustment knob configured to selectively control a compression member to adjust a pulse of the blood analog flowing through the simulated blood vessel.

14. An anatomical training model for simulating intravascular insertion of a medical device, the training model comprising:
   a puncture insert configured to simulate vasculature of a patient, the puncture insert including a transparent housing having an open top end, a transparent simulated body tissue, at least one transparent simulated blood vessel suspended in the simulated body tissue, and a simulated skin layer;
   the transparent simulated body tissue provided within the housing;

the simulated transparent blood vessel configured to be in fluid communication with a blood analog;

the simulated skin layer removably attached to the housing and configured to cover a top surface of the simulated body tissue; and the training model further having clinically relevant ultrasonic properties corresponding to ultrasonic properties of a human body site for ultrasound imaging.

15. The anatomical training model according to claim 14, wherein the simulated body tissue includes clinically relevant ultrasonic acoustic and optical properties.

16. The anatomical training model according to claim 14, wherein the simulated body tissue comprises a colloidal suspension of a ballistic gel and poly(methyl methacrylate) (PMMA).

17. The anatomical training model according to claim 14, further comprising an anatomical body part attached to the puncture insert and configured to provide a proper orientation for the puncture insert.

18. The anatomical training model according to claim 17, wherein the anatomical body part comprises a simulated hand and a simulated wrist.

19. The anatomical training model according to claim 14, further comprising a support base configured to stably and removably secure the puncture insert in a predetermined orientation.

20. The anatomical training model according to claim 14, wherein the simulated blood vessel of the puncture insert is configured to simulate a radial artery.

* * * * *